(12) United States Patent
Jung et al.

(10) Patent No.: US 12,253,296 B2
(45) Date of Patent: *Mar. 18, 2025

(54) VACUUM ADIABATIC BODY AND REFRIGERATOR

(71) Applicant: LG ELECTRONICS INC., Seoul (KR)

(72) Inventors: Wonyeong Jung, Seoul (KR); Daewoong Kim, Seoul (KR); Hyeunsik Nam, Seoul (KR); Deokhyun Youn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/415,345

(22) Filed: Jan. 17, 2024

(65) Prior Publication Data

US 2024/0159449 A1    May 16, 2024

Related U.S. Application Data

(63) Continuation of application No. 17/879,446, filed on Aug. 2, 2022, now Pat. No. 11,913,706, which is a
(Continued)

(30) Foreign Application Priority Data

Jun. 27, 2018   (KR) .................. 10-2018-0074164

(51) Int. Cl.
  *F16L 59/065*   (2006.01)
  *F25D 23/00*    (2006.01)
(Continued)

(52) U.S. Cl.
  CPC ......... *F25D 23/006* (2013.01); *F25D 23/065* (2013.01); *F16L 59/065* (2013.01);
(Continued)

(58) Field of Classification Search
  None
  See application file for complete search history.

(56) References Cited

U.S. PATENT DOCUMENTS 4,186,945 A    2/1980  Hahn
5,989,371 A   11/1999  Nishimoto
(Continued)

FOREIGN PATENT DOCUMENTS

CN    107850375    3/2018
CN    107850377    3/2018
(Continued)

OTHER PUBLICATIONS

International Search Report and Written Opinion dated Oct. 7, 2019 issued in Application No. PCT/KR2019/007749.
(Continued)

*Primary Examiner* — Alexander S Thomas
(74) *Attorney, Agent, or Firm* — KED & ASSOCIATES, LLP

(57) ABSTRACT

A vacuum adiabatic body includes a heat exchange pipeline and a sealing assembly. The heat exchange pipeline includes at least two pipelines which pass through a first plate and a second plate to allow a refrigerant to move between inner and outer spaces. The sealing assembly allows the heat exchange pipeline to pass through the first plate and the second plate without contacting a vacuum space provided between the first and second plates.

13 Claims, 35 Drawing Sheets

Related U.S. Application Data continuation of application No. 16/979,250, filed as application No. PCT/KR2019/007749 on Jun. 26, 2019, now Pat. No. 11,428,456.

(51) Int. Cl.
 *F25D 23/06* (2006.01)
 *F25D 23/02* (2006.01)
 *F25D 23/08* (2006.01)

(52) U.S. Cl.
 CPC ............ *F25D 23/02* (2013.01); *F25D 23/087* (2013.01); *F25D 2201/14* (2013.01); *Y10T 428/231* (2015.01)

(56) References Cited

U.S. PATENT DOCUMENTS

| | | | | |
|---|---|---|---|---|
| 11,598,476 | B2 * | 3/2023 | Jung | .................... F25D 23/087 |
| 11,768,026 | B2 * | 9/2023 | Nam | ....................... F25D 23/00 |
| | | | | 62/441 |
| 11,913,706 | B2 * | 2/2024 | Jung | .................... F25D 23/063 |
| 2004/0144130 | A1 | 7/2004 | Jung | |
| 2005/0175809 | A1 | 8/2005 | Hirai et al. | |
| 2009/0056367 | A1 | 3/2009 | Neumann | |
| 2013/0111942 | A1 | 5/2013 | Jung | |
| 2015/0030800 | A1 | 1/2015 | Jung et al. | |
| 2016/0290690 | A1 | 10/2016 | Jung et al. | |
| 2018/0045456 | A1 | 2/2018 | Cur | |
| 2018/0224195 | A1 | 8/2018 | Jung et al. | |
| 2018/0238486 | A1 | 8/2018 | Jung et al. | |
| 2018/0238610 | A1 | 8/2018 | Jung et al. | |
| 2019/0255980 | A1 | 8/2019 | Jung et al. | |

FOREIGN PATENT DOCUMENTS

| | | | |
|---|---|---|---|
| EP | 1 441 187 | | 7/2004 |
| EP | 2 589 905 | | 5/2013 |
| EP | 2722624 | | 4/2014 |
| JP | H 10300331 | | 11/1998 |
| JP | 2012-087993 | | 5/2012 |
| KR | 10-0343719 | | 6/2002 |
| KR | 10-2013-0049495 | | 5/2013 |
| KR | 10-2015-0012712 | | 2/2015 |
| KR | 10-2019-0070753 | | 6/2019 |
| RU | 7 480 | | 8/1998 |
| RU | 2383833 | | 3/2010 |
| RU | 2608791 | | 1/2017 |
| WO | WO 2017/023095 | | 2/2017 |
| WO | WO 2017/105030 | | 6/2017 |
| WO | WO-2018111235 A1 * | 6/2018 | ............ F16L 59/121 |

OTHER PUBLICATIONS

Indian Office Action issued in Application No. 202017043695 dated Apr. 30, 2021.
Russian Office Action issued in Application No. 2020132152 dated May 28, 2021.
Russian Office Action dated Sep. 17, 2021 issued in Application No. 2020132152/10(058396).
Chinese Office Action dated Sep. 22, 2021 issued in Application No. 201980022983.X.
European Search Report dated Feb. 17, 2022 issued in EP Application No. 19825195.1.
Chinese Office Action dated Apr. 22, 2022 issued in CN Application No. 201980022983.X.
Australian Notice of Acceptance dated Jun. 7, 2022 issued in Application 2019292212.
U.S. Office Action dated Apr. 17, 2023 issued in U.S. Appl. No. 17/879,446.

* cited by examiner

FIG. 4

| Group | | General plastic | | | | Engineering plastic | | |
|---|---|---|---|---|---|---|---|---|
| Meaterial | | (HD)PE ※G-Plastic Reference | PC | Glass fiber PC (30% Glass-F) | ※Low outgassing PC | PCTFE | PPS | LCP | PEEK |
| Out-gassing rate | TML(%) | 0.58 | 0.19 | 0.14 | No Data | 0.01 | 0.06 | 0.06 | 0.26 |
| Compressive Strength | MPa | 31.7 | 82.8 | 124.1 | *80.6 | 37.9 | 107.0 | *151.1 | 137.9 |
| Thermal Conductivity | W/m-k | <0.40 | 0.18 | 0.18 | 0.18 | 0.20 | 0.3 | 0.36 (G/F 50%) | 0.25 |
| Strength /Cond. | MPa·m-k/W | 79 | 460 | 689 | 448 | 189 | 357 | 420 | 552 |
| Heat Deflection Temp at 264 psi | °C | 80 | 132 | 146 | 125 | 126 | 121 | 105 ~ 260 | 160 |
| Max Operating Temperature | °C | 82 | 121 | 132 | No Data | 132 | 218 | No Data | 249 |
| *Cost(per 1kg) | | Low | $3.1 | $6.2(G/F20%) | $6.7 | High | $30 | $40 | $150 |

VACUUM ADIABATIC BODY AND REFRIGERATOR

CROSS-REFERENCE TO RELATED APPLICATIONS

This application is a Continuation Application of U.S. Patent Application Ser. No. 17/879,446 filed Aug. 2, 2022, now issued as U.S. Pat. No. 11,913,706, which is a Continuation Application of U.S. patent application Ser. No. 16/979,250 filed Sep. 9, 2020, now issued as U.S. Pat. No. 11,428,456, which is a U.S. National Stage Application under 35 U.S.C. § 371 of PCT Application No. PCT/KR2019/007749, filed Jun. 26, 2019, which claims priority to Korean Patent Application No. 10-2018-0074164, filed Jun. 27, 2018, whose entire disclosures are hereby incorporated by reference.

BACKGROUND

1. Field

The present disclosure relates to a vacuum adiabatic body and a refrigerator.

2. Background

A vacuum adiabatic body is a product for suppressing heat transfer by vacuumizing the interior of a body thereof. The vacuum adiabatic body may reduce heat transfer by convection and conduction, and hence is applied to heating apparatuses and refrigerating apparatuses. In a typical adiabatic method applied to a refrigerator, although it is differently applied in refrigeration and freezing, a foam urethane adiabatic wall having a thickness of about 30 cm or more is generally provided. However, the internal volume of the refrigerator is therefore reduced.

In order to increase the internal volume of a refrigerator, there is an attempt to apply a vacuum adiabatic body to the refrigerator.

First, Korean Patent No. 10-0343719 (Cited Document 1) of the present applicant has been disclosed. According to Reference Document 1, there is disclosed a method in which a vacuum adiabatic panel is prepared and then built in walls of a refrigerator, and the exterior of the vacuum adiabatic panel is finished with a separate molding as Styrofoam. According to the method, additional foaming is not required, and the adiabatic performance of the refrigerator is improved. However, fabrication cost is increased, and a fabrication method is complicated. As another example, a technique of providing walls using a vacuum adiabatic material and additionally providing adiabatic walls using a foam filling material has been disclosed in Korean Patent Publication No. 10-2015-0012712 (Cited Document 2). According to Reference Document 2, fabrication cost is increased, and a fabrication method is complicated.

To solve this problem, the present applicant had filed Korean Patent Application NO. 10-2013-0049495 (Cited Document 3). This technique provides a vacuum adiabatic body in an empty vacuum state without providing a separate adiabatic material therein. In addition, this technique provides a technique in which a heat exchange pipeline is disposed in the vacuum adiabatic body. The heat exchange pipeline is a pipeline in which two pipelines, i.e., an inlet pipe of an evaporator and an outlet pipe of the evaporator, contact each other. The heat exchange pipeline is a pipeline in which a refrigerant flowing through the inside of the two pipelines are heat-exchanged with each other to improve performance of a refrigerating cycle.

The heat exchange pipeline passes through the inside of the vacuum space part to extend to the outside and inside of the refrigerator. Thus, to maintain the vacuum state of the vacuum space part, a position at which the heat exchange pipeline passes through the vacuum space part and a plate inside the refrigerator and a position at which the heat exchange pipeline passes through the vacuum space part and a plate outside the refrigerator have to be sealed. To achieve the above objects, this applicant has disclosed a structure for sealing a separate pipeline of a branched heat exchange pipeline in FIGS. 17 and 18, which is disclosed in Korean Patent Application No. 10-2017-0171596 (Cited Document 4).

According to the cited document 4, to maintain the sealing, the two pipelines of the heat exchange pipelines may be branched to pass through the vacuum space part to cause four penetrated portions. However, as the number of penetrated portions increases, a heat loss may occur. Also, if there is a problem in sealing at any one portion, it is not preferable because it is difficult to maintain vacuum in the vacuum space part. Also, a welding part of the two pipelines may be exposed to the vacuum space part, and thus, a gas generated from the welding part may destroy the vacuum state of the vacuum space part.

In addition, a pressure loss of a refrigerant may occur due to a sharp bending angle of the branched point of each of the two pipelines constituting the heat exchange pipelines. The bending angle of the heat exchange pipeline further increases due to a pitch gap (about 200 mm) of the bar constituting the supporting unit. Also, since heterogeneous bonding is performed between a stainless material forming the vacuum space part and a copper material forming the heat exchange pipeline at the penetrated portion, it is difficult to carry out the work.

The cited documents disclose a feature in which the heat exchange pipeline is placed in the vacuum adiabatic body to maintain the thermal insulation. For this, since many pipelines of the heat exchange pipeline have to be disposed at the fixed positions within the vacuum adiabatic body before the vacuum adiabatic body is vacuum sealed, it may be difficult to perform the work. Also, there is a high possibility that the vacuum state of the vacuum adiabatic body is destroyed by the sealing, which may lead to discarding the vacuum adiabatic body.

BRIEF DESCRIPTION OF THE DRAWINGS

The embodiments will be described in detail with reference to the following drawings in which like reference numerals refer to like elements wherein:

FIG. 4 is a diagram illustrating results obtained by examining resins.

DETAILED DESCRIPTION

Figure 1:
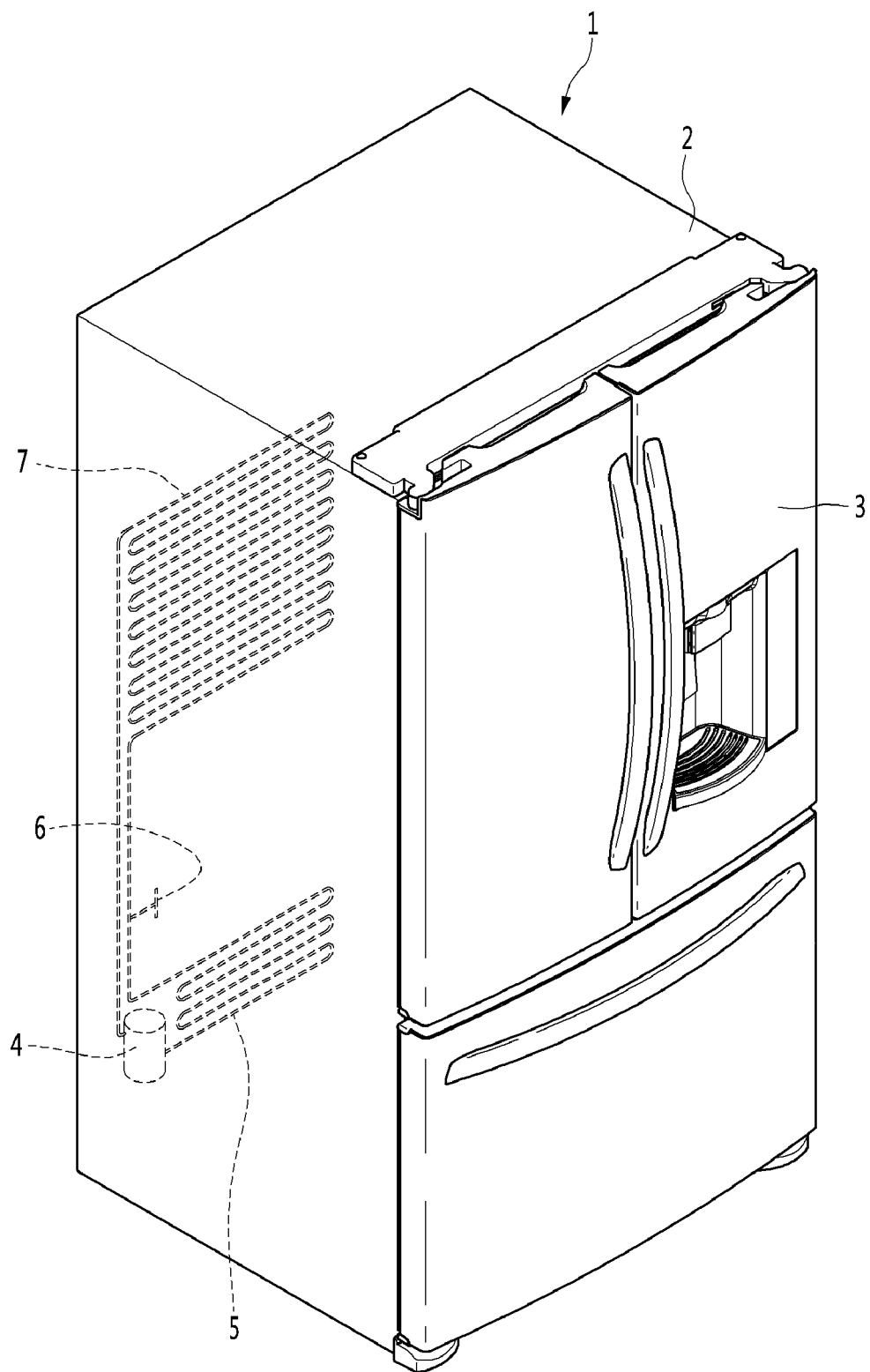
FIG. 1 is a perspective view of a refrigerator according to an embodiment.

Hereinafter, exemplary embodiments will be described with reference to the accompanying drawings. The invention may, however, be embodied in many different forms and should not be construed as being limited to the embodiments set forth herein, and a person of ordinary skill in the art, who understands the spirit of the present invention, may readily implement other embodiments included within the scope of the same concept by adding, changing, deleting, and adding components; rather, it will be understood that they are also included within the scope of the present invention.

The drawings shown below may be displayed differently from the actual product, or exaggerated or simple or detailed parts may be deleted, but this is intended to facilitate understanding of the technical idea of the present invention. It should not be construed as limited.

The number of each of the components illustrated together with the drawings facilitates the understanding of the inventive concept by assigning the same or similar number to the same or similar component in function. Similarly, in the case of performing the same or similar function in function even if the embodiments are different, the same or similar number is assigned to facilitate the understanding of the invention.

In the accompanying drawings for providing further understanding of the invention, the same reference numeral will be given to the same constituent. This is to avoid duplicated explanations in the understanding of the idea of the invention and focus on the differences between the embodiments.

In the following description, the vacuum pressure means any pressure state lower than the atmospheric pressure. In addition, the expression that a vacuum degree of A is higher than that of B means that a vacuum pressure of A is lower than that of B.

FIG. 1 is a perspective view of a refrigerator according to an embodiment.

Referring to FIG. 1, the refrigerator 1 includes a main body 2 provided with a cavity 9 capable of storing storage goods and a door 3 provided to open/close the main body 2. The door 3 may be rotatably or slidably movably disposed to open/close the cavity 9. The cavity 9 may provide at least one of a refrigerating compartment and a freezing compartment.

The refrigerator 1 may include parts or devices constituting a freezing cycle in which cold air is supplied into the cavity 9. For example, the parts may include a compressor 4 for compressing a refrigerant, a condenser 5 for condensing the compressed refrigerant, an expander 6 for expanding the condensed refrigerant, and an evaporator 7 for evaporating the expanded refrigerant to take heat. As a typical structure, a fan may be installed at a position adjacent to the evaporator 7, and a fluid blown from the fan may pass through the evaporator 7 and then be blown into the cavity 9. A freezing load is controlled by adjusting the blowing amount and blowing direction by the fan, adjusting the amount of a circulated refrigerant, or adjusting the compression rate of the compressor 4, so that it is possible to control a refrigerating space or a freezing space.

Figure 2:
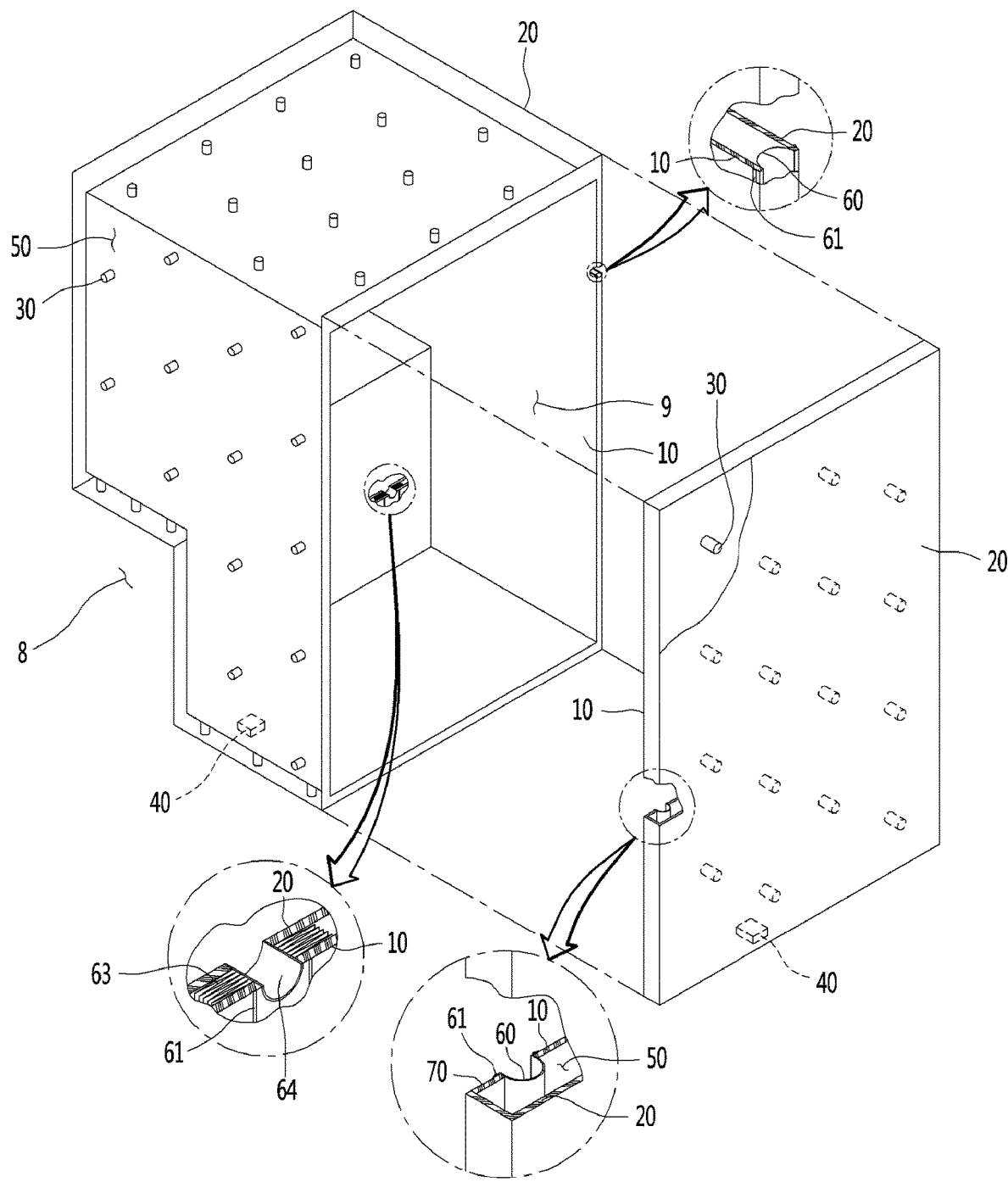
FIG. 2 is a view schematically showing a vacuum adiabatic body used in a main body and a door of the refrigerator.

FIG. 2 is a view schematically showing a vacuum adiabatic body used in the main body and the door of the refrigerator. In FIG. 2, a main body-side vacuum adiabatic body is illustrated in a state in which top and side walls are removed, and a door-side vacuum adiabatic body is illustrated in a state in which a portion of a front wall is removed. In addition, sections of portions at conductive resistance sheets are provided are schematically illustrated for convenience of understanding.

Referring to FIG. 2, the vacuum adiabatic body includes a first plate member 10 for providing a wall of a low-temperature space, a second plate member 20 for providing a wall of a high-temperature space, and a vacuum space part or gap 50 defined as a gap part between the first and second plate members 10 and 20. Also, the vacuum adiabatic body includes the conductive resistance sheets or seals 60 and 63 to prevent heat conduction between the first and second plate members 10 and 20. A sealing or welding part 61 to seal the first and second plate members 10 and 20 is provided such that the vacuum space part 50 is in a sealing state.

When the vacuum adiabatic body is applied to a refrigerator or a warming apparatus, the first plate member 10 providing a wall of an inner space of the refrigerator 1 may be referred to as an inner case, and the second plate member 20 providing a wall of an outer space of the refrigerator 1 may be referred to as an outer case.

A machine room 8 in which parts providing a freezing cycle are accommodated is placed at a lower rear side of the main body-side vacuum adiabatic body, and an exhaust port 40 to form a vacuum state by exhausting air in the vacuum space part 50 is provided at any one side of the vacuum adiabatic body. In addition, a pipeline 64 passing through the vacuum space part 50 may be further installed so as to install a defrosting water line and electric lines.

The first plate member 10 may define at least one portion of a wall for a first space provided thereto. The second plate member 20 may define at least one portion of a wall for a second space provided thereto. The first space and the second space may be defined as spaces having different temperatures. Here, the wall for each space may serve as not only a wall directly contacting the space but also a wall not contacting the space. For example, the vacuum adiabatic body of the embodiment may also be applied to a product further having a separate wall contacting each space. The vacuum space part 50 may be provided between the first and second plate members 10 and 20, and the vacuum space part 50 may alternatively be referred to as a third space.

Factors of heat transfer, which cause loss of the adiabatic effect of the vacuum adiabatic body, are heat conduction between the first and second plate members 10 and 20, heat radiation between the first and second plate members 10 and 20, and gas conduction of the vacuum space part 50.

Hereinafter, a heat resistance unit provided to reduce adiabatic loss related to the factors of the heat transfer will be provided. Meanwhile, the vacuum adiabatic body and the refrigerator of the embodiment do not exclude that another adiabatic means is further provided to at least one side of the vacuum adiabatic body. Therefore, an adiabatic means using foaming or the like may be further provided or applied to another side of the vacuum adiabatic body.

The heat resistance unit may include a conductive resistance sheet that resists conduction of heat transferred along a wall of a third or vacuum space 50 and may further include a side frame coupled to the conductive resistance sheet. The conductive resistance sheet and the side frame will be clarified by the following description.

Also, the heat resistance unit may include at least one radiation resistance sheet that is provided in a plate shape within the third space or may include a porous material that resists radiation heat transfer between the second plate member and the first plate member within the third space. The radiation resistance sheet and the porous material will be clarified by the following description.

FIG. 3 shows views illustrating various embodiments of an internal configuration of the vacuum space part.

Figure 3A:
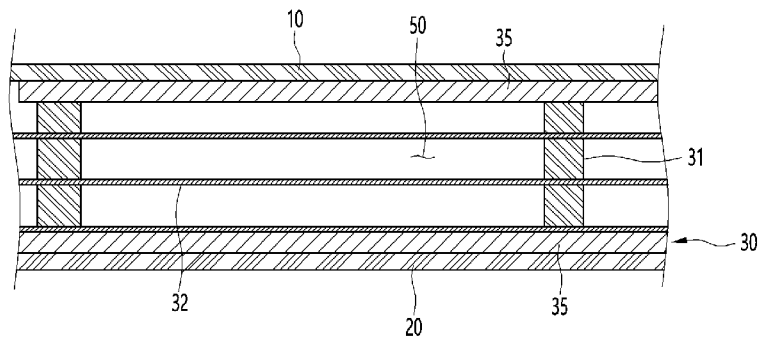
FIGS. 3A to 3C shows view illustrating various embodiments of an internal configuration of a vacuum space part.
Figure 3B:
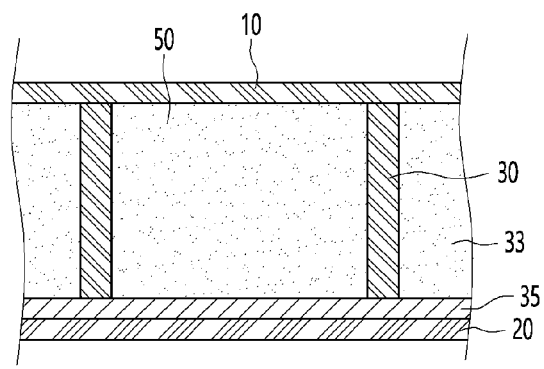

First, referring to FIG. 3A, the vacuum space part 50 may be provided in a third or vacuum space 50 having a pressure different from that of each of the first and second spaces, preferably, a vacuum state, thereby reducing an adiabatic loss. The third space may be provided at a temperature between the temperature of the first space and the temperature of the second space. Since the third space is provided as a space in the vacuum state, the first and second plate members 10 and 20 receive force contracted in a direction in which they approach each other due to a force corresponding to a pressure difference between the first and second spaces. Therefore, the vacuum space part 50 may be deformed in a direction in which a distance between the plate members 10 and 20 is reduced. In this case, the adiabatic loss may be caused due to an increase in amount of heat radiation, caused by the contraction of the vacuum space part 50, and an increase in amount of heat conduction, caused by contact between the plate members 10 and 20.

A supporting unit or support 30 may be provided to reduce deformation of the vacuum space part 50. The supporting unit 30 includes a bar or pillar 31. The bar 31 may extend in a substantially vertical direction with respect to the plate members 10 and 20 to support a distance between the first plate member 10 and the second plate member 20. A support plate 35 may be additionally provided on at least any one end of the bar 31. The support plate 35 may connect at least two or more bars 31 to each other to extend in a horizontal direction with respect to the first and second plate members 10 and 20. The support plate 35 may be provided in a plate shape or may be provided in a lattice shape so that an area of the support plate 35 contacting the first or second plate member 10 or 20 decreases, thereby reducing heat transfer. The bars 31 and the support plate 35 are fixed to each other at at least one portion, to be inserted together between the first and second plate members 10 and 20. The support plate 35 contacts at least one of the first and second plate members 10 and 20, thereby preventing deformation of the first and second plate members 10 and 20. In addition, based on the extending direction of the bars 31, a total sectional area of the support plate 35 is provided to be greater than that of the bars 31, so that heat transferred through the bars 31 may be diffused through the support plate 35.

A material of the supporting unit 30 will be described.

The supporting unit 30 is to have a high compressive strength so as to endure the vacuum pressure. Also, the supporting unit 30 is to have a low outgassing rate and a low water absorption rate so as to maintain the vacuum state. Also, the supporting unit 30 is to have a low thermal conductivity so as to reduce the heat conduction between the plate members. Also, the supporting unit 30 is to secure the compressive strength at a high temperature so as to endure a high-temperature exhaust process. Also, the supporting unit 30 is to have an excellent machinability so as to be subjected to molding. Also, the supporting unit 30 is to have a low cost for molding. Here, the time required to perform the exhaust process takes about a few days. Hence, the time is reduced, thereby considerably improving fabrication cost and productivity. The compressive strength is to be secured at the high temperature because an exhaust speed is increased as a temperature at which the exhaust process is performed becomes higher. The inventor has performed various examinations under the above-described conditions.

First, ceramic or glass has a low outgassing rate and a low water absorption rate, but its machinability is remarkably lowered. Hence, the ceramic and glass may not be used as the material of the supporting unit 30. Resin may be considered as the material of the supporting unit 30.

FIG. 4 is a diagram illustrating results obtained by examining resins.

Referring to FIG. 4, the present inventor has examined various resins, and most of the resins cannot be used because their outgassing rates and water absorption rates are remarkably high. Accordingly, the present inventor has examined resins that approximately satisfy conditions of the outgassing rate and the water absorption rate. As a result, polyethylene (PE) is inappropriate to be used due to its high outgassing rate and its low compressive strength. Polychlorotrifluoroethylene (PCTFE) is not preferable to be used due to its remarkably high price. Polyether ether ketone (PEEK) is inappropriate to be used due to its high outgassing rate. Accordingly, it is determined that that a resin selected from the group consisting of polycarbonate (PC), glass fiber PC, low outgassing PC, polyphenylene sulfide (PPS), and liquid crystal polymer (LCP) may be used as the material of the supporting unit 30. However, an outgassing rate of the PC is 0.19, which is at a low level. Hence, as the time required to perform baking or heating in which exhaustion is performed by applying heat is increased to a certain level, the PC may be used as the material of the supporting unit 30.

The present inventor has found an optimal material by performing various studies on resins expected to be used inside the vacuum space part 50. Hereinafter, results of the performed studies will be described with reference to the accompanying drawings.

Figure 5:
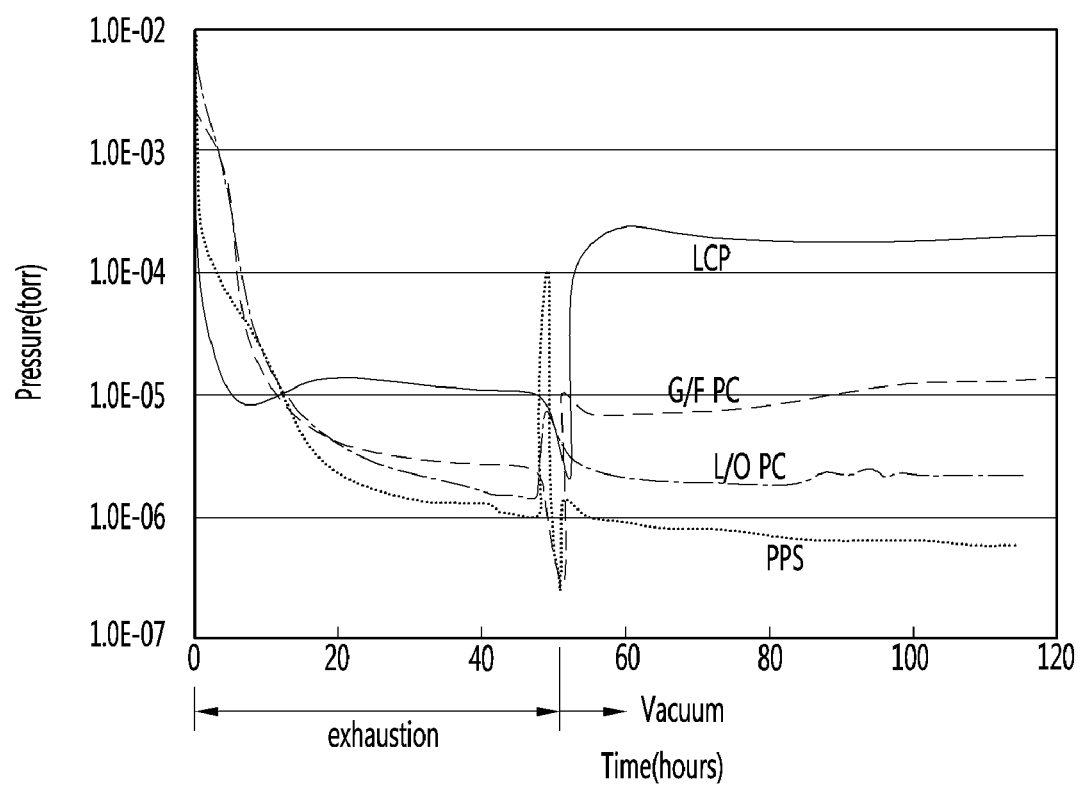
FIG. 5 illustrates results obtained by performing an experiment on vacuum maintenance performances of resins.

FIG. 5 is a view illustrating results obtained by performing an experiment on vacuum maintenance performances of the resins.

Referring to FIG. 5, there is illustrated a graph showing results obtained by fabricating the supporting unit 30 using the respective resins and then testing vacuum maintenance performances of the resins. First, a supporting unit 30 fabricated using a selected material was cleaned using ethanol, left at a low pressure for 48 hours, exposed to the air for 2.5 hours, and then subjected to an exhaust process at 90° C. for about 50 hours in a state that the supporting unit 30 was put in the vacuum adiabatic body, thereby measuring a vacuum maintenance performance of the supporting unit 30.

It may be seen that in the case of the LCP, its initial exhaust performance is best, but its vacuum maintenance performance is bad. It may be expected that this is caused by sensitivity of the LCP to temperature. Also, it is expected through characteristics of the graph that, when a final allowable pressure is $5 \times 10^{-3}$ Torr, its vacuum performance will be maintained for a time of about 0.5 years. Therefore, the LCP is inappropriate as the material of the supporting unit.

It may be seen that, in the case of the glass fiber PC (G/F PC), its exhaust speed is fast, but its vacuum maintenance performance is low. It is determined that this will be influenced by an additive. Also, it is expected through the characteristics of the graph that the glass fiber PC will maintain its vacuum performance will be maintained under the same condition for a time of about 8.2 years. Therefore, the LCP is inappropriate as the material of the supporting unit.

It is expected that, in the case of the low outgassing PC (O/G PC), its vacuum maintenance performance is excellent, and its vacuum performance will be maintained under the same condition for a time of about 34 years, as compared with the above-described two materials. However, it may be seen that the initial exhaust performance of the low outgassing PC is low, and therefore, the fabrication efficiency of the low outgassing PC is lowered.

It may be seen that, in the case of the PPS, its vacuum maintenance performance is remarkably excellent, and its exhaust performance is also excellent. Therefore, it is most preferably considered that, based on the vacuum maintenance performance, the PPS is used as the material of the supporting unit 30.

Figure 6A:
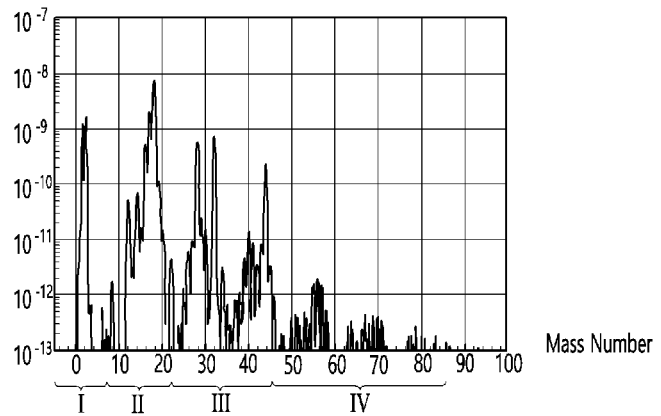
FIGS. 6A-6C illustrate results obtained by analyzing components of gases discharged from a PPS and a low outgassing PC.
Figure 6B:
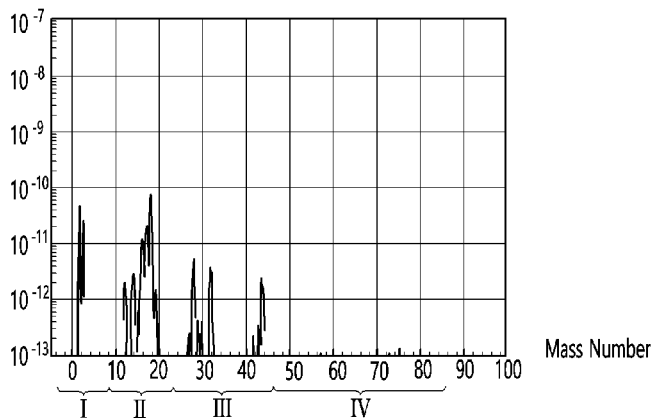
Figure 6C:
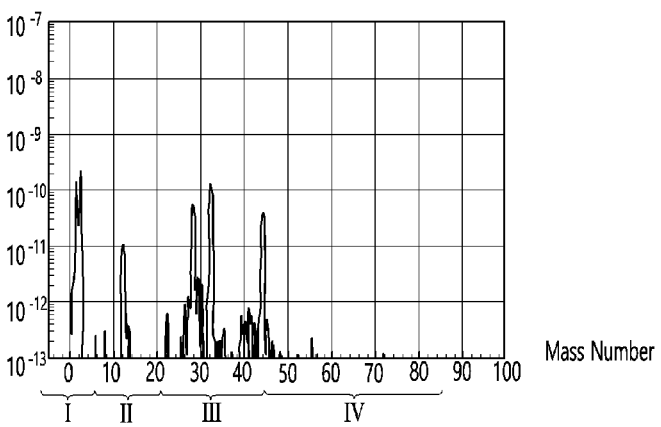

FIGS. 6A-6C illustrate results obtained by analyzing components of gases discharged from the PPS and the low outgassing PC, in which the horizontal axis represents mass numbers of gases and the vertical axis represents concentrations of gases. FIG. 6A illustrates a result obtained by analyzing a gas discharged from the low outgassing PC. In FIG. 6A, it may be seen that H2 series (I), H2O series (II), N2/CO/CO2/O2 series (III), and hydrocarbon series (IV) are equally discharged. FIG. 6B illustrates a result obtained by analyzing a gas discharged from the PPS. In FIG. 6B, it may be seen that H2 series (I), H2O series (II), and N2/CO/CO2/O2 series (III) are discharged to a weak extent. FIG. 6C is a result obtained by analyzing a gas discharged from stainless steel. In FIG. 6C, it may be seen that a similar gas to the PPS is discharged from the stainless steel. Consequently, it may be seen that the PPS discharges a similar gas to the stainless steel.

As the analyzed result, it may be re-confirmed that the PPS is excellent as the material of the supporting unit.

To further reinforce the strength of the supporting unit 30, a material added with glass fiber (G/F) of several tens %, preferably, G/F of 40% together with the PPS may be used. To further increase a strength of a PPS+G/F 40% material used in the supporting unit 30, the PPS+G/F 40% material may be further subjected to a crystallization process (left under an atmosphere of 150° C. or more for about 1 hour) as a post-treatment process after injection.

Figure 7:
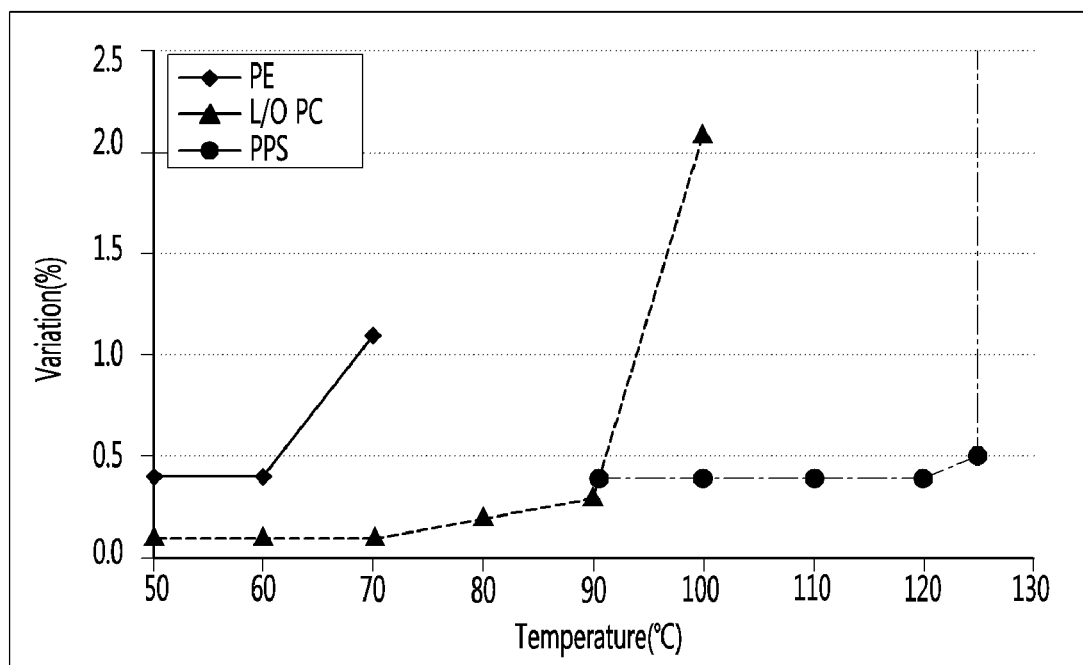
FIG. 7 illustrates results obtained by measuring maximum deformation temperatures at which resins are damaged by atmospheric pressure in high-temperature exhaustion.

FIG. 7 illustrates results obtained by measuring maximum deformation temperatures at which resins are damaged by atmospheric pressure in high-temperature exhaustion. At this time, the bars 31 were provided at a diameter of 2 mm at a distance of 30 mm. Referring to FIG. 7, it may be seen that a rupture occurs at 60° C. in the case of the PE, a rupture occurs at 90° C. in the case of the low outgassing PC, and a rupture occurs at 125° C. in the case of the PPS.

As the analyzed result, it may be seen that the PPS is most preferably used as the resin used inside the vacuum space part 50. However, the low outgassing PC may be used in terms of fabrication cost.

Referring back to FIG. 3A, a radiation resistance sheet 32 for reducing heat radiation between the first and second plate members 10 and 20 through the vacuum space part 50 will be described. The first and second plate members 10 and 20 may be made of a stainless material capable of preventing corrosion and providing a sufficient strength. The stainless material has a relatively high emissivity of 0.16, and hence a large amount of radiation heat may be transferred. In addition, the supporting unit 30 made of the resin has a lower emissivity than the plate members, and is not entirely provided to inner surfaces of the first and second plate members 10 and 20. Hence, the supporting unit 30 does not have great influence on radiation heat. Therefore, the radiation resistance sheet 32 may be provided in a plate shape over a majority of the area of the vacuum space part 50 so as to concentrate on reduction of radiation heat transferred between the first and second plate members 10 and 20. A product having a low emissivity may be used as the material of the radiation resistance sheet 32. In an embodiment, an aluminum foil having an emissivity of 0.02 may be used as the radiation resistance sheet 32. Also, since the transfer of radiation heat may not be sufficiently blocked using one radiation resistance sheet, at least two radiation resistance sheets 32 may be provided at a certain distance so as not to contact each other. Also, at least one radiation resistance sheet 32 may be provided in a state in which it contacts the inner surface of the first or second plate member 10 or 20.

Referring back to FIG. 3B, the distance between the first and second plate members 10 and 20 is maintained by the supporting unit 30, and a porous material 33 may be filled in the vacuum space part 50. The porous material 33 may have a higher emissivity than the stainless material of the first and second plate members 10 and 20. However, since the porous material 33 is filled in the vacuum space part 50, the porous material 33 has a high efficiency for resisting the radiation heat transfer.

In the present embodiment, the vacuum adiabatic body may be manufactured without the radiation resistance sheet 32.

Figure 3C:
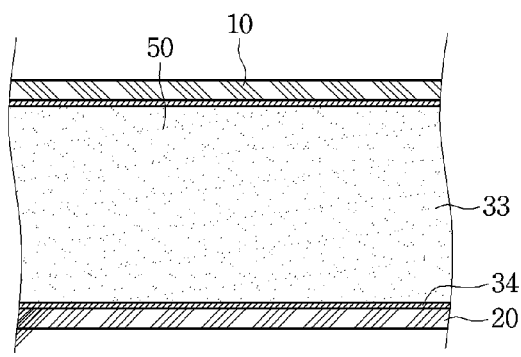

Referring to FIG. 3C, the supporting unit 30 for maintaining the vacuum space part 50 may not be provided. A porous material 33 may be provided to be surrounded by a film 34 instead of the supporting unit 30. Here, the porous material 33 may be provided in a state of being compressed so that the gap of the vacuum space part 50 is maintained. The film 34 made of, for example, a PE material may be provided in a state in which a hole is punched in the film 34.

In the present embodiment, the vacuum adiabatic body may be manufactured without the supporting unit 30. That is to say, the porous material 33 may perform the function of the radiation resistance sheet 32 and the function of the supporting unit 30 together.

Figure 8A:
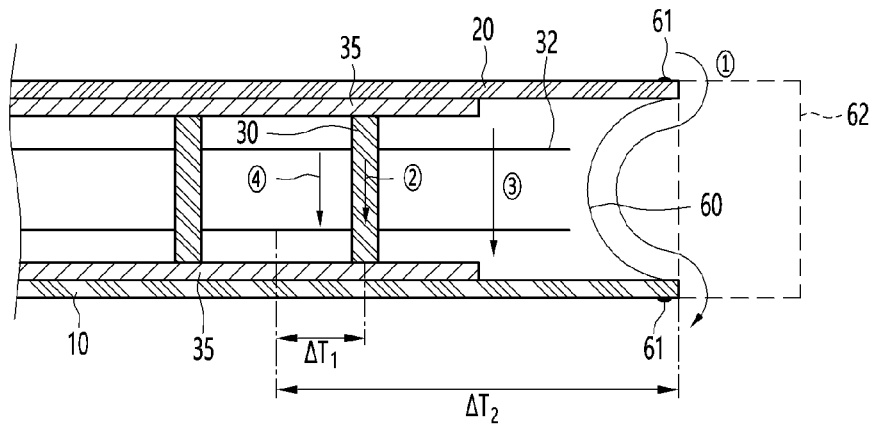
FIGS. 8A-8C are views showing various embodiments of conductive resistance sheets and peripheral parts thereof.
Figure 8B:
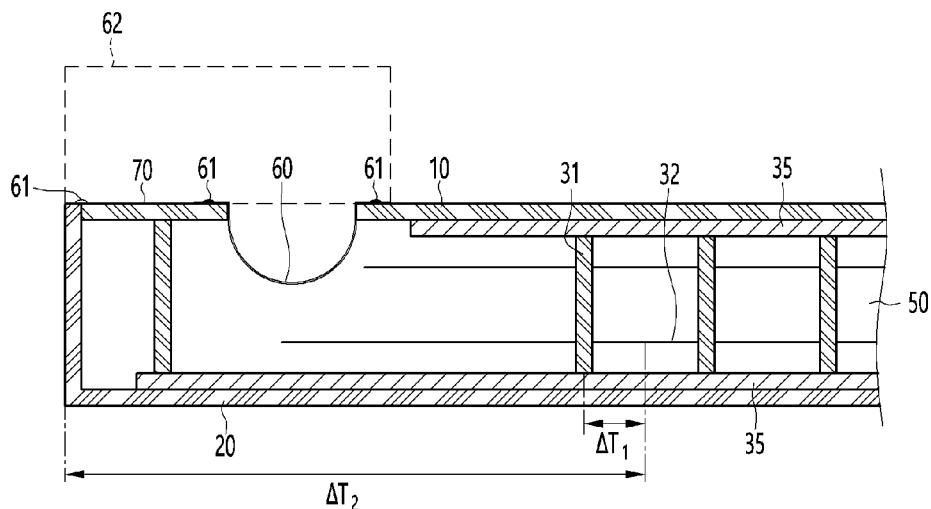
Figure 8C:
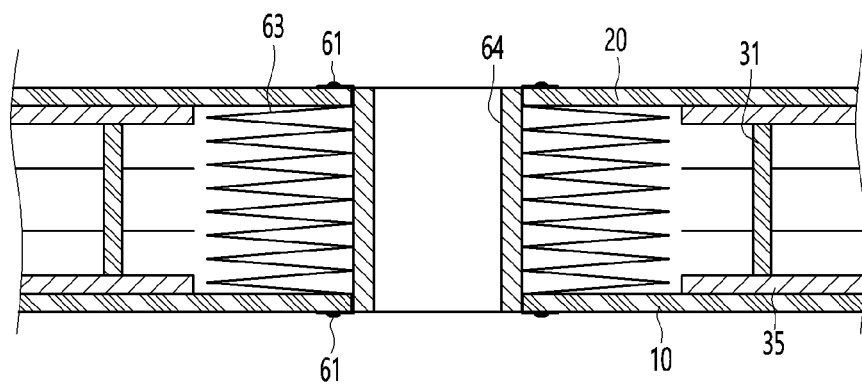

FIGS. 8A-8C are views showing various embodiments of conductive resistance sheets and peripheral parts thereof. Structures of the conductive resistance sheets are briefly illustrated in FIG. 2, but will be understood in detail with reference to the drawings.

First, a conductive resistance sheet 32 proposed in FIG. 8A may be applied to the main body-side vacuum adiabatic body. Specifically, the first and second plate members 10 and 20 are to be sealed so as to vacuumize the interior of the vacuum adiabatic body. In this case, since the two plate members 10 and 20 have different temperatures from each other, heat transfer may occur between the two plate members. A conductive resistance sheet 60 is provided to prevent heat conduction between two different kinds of plate members 10 and 20.

The conductive resistance sheet 60 may be provided with sealing or welding parts 61 at which both ends of the conductive resistance sheet 60 are sealed to define at least one portion of the wall for the third space or vacuum space part 50 and maintain the vacuum state. The conductive resistance sheet 60 may be provided as a thin foil in unit of micrometer so as to reduce the amount of heat conducted along the wall for the third space 50. The sealing parts 61 may be provided as welding parts. That is, the conductive resistance sheet 60 and the plate members 10 and 20 may be fused to each other. In order to cause a fusing action between the conductive resistance sheet 60 and the plate members 10 and 20, the conductive resistance sheet 60 and the plate members 10 and 20 may be made of the same material, and a stainless material may be used as the material. The sealing parts 61 are not limited to the welding parts, and may be provided through a process such as cocking. The conductive resistance sheet 60 may be provided in a curved shape. Thus, a heat conduction distance of the conductive resistance sheet 60 is provided longer than the linear distance of each plate member or a linear distance between the plate members 10 and 20, so that the amount of heat conduction may be further reduced.

A change in temperature occurs along the conductive resistance sheet 60. Therefore, in order to block heat transfer to the exterior of the conductive resistance sheet 60, a shielding part or cover 62 may be provided at the exterior of the conductive resistance sheet 60 such that an adiabatic action occurs. In other words, in the refrigerator, the second plate member 20 has a high temperature and the first plate member 10 has a low temperature. In addition, heat conduction from high temperature to low temperature occurs in the conductive resistance sheet 60, and hence the temperature of the conductive resistance sheet 60 is suddenly changed. Therefore, when the conductive resistance sheet 60 is opened to the exterior thereof, heat transfer through the opened or exterior space may seriously occur. In order to reduce heat loss, the shielding part 62 is provided at the exterior of the conductive resistance sheet 60. For example, when the conductive resistance sheet 60 is exposed to any one of the low-temperature space and the high-temperature space, the conductive resistance sheet 60 does not serve as a conductive resistor as well as the exposed portion thereof, which is not preferable.

The shielding part 62 may be provided as a porous material contacting an outer surface of the conductive resistance sheet 60. The shielding part 62 may be provided as an adiabatic structure, e.g., a separate gasket, which is placed at the exterior of the conductive resistance sheet 60. The shielding part 62 may be provided as a portion of the vacuum adiabatic body, which is provided at a position facing a corresponding conductive resistance sheet 60 when the main body-side vacuum adiabatic body is closed with respect to the door-side vacuum adiabatic body. In order to reduce heat loss even when the main body and the door are opened, the shielding part 62 may be provided as a porous material or a separate adiabatic structure.

A conductive resistance sheet proposed in FIG. 8B may be applied to the door-side vacuum adiabatic body. In FIG. 8B, portions different from those of FIG. 8A are described in detail, and the same description is applied to portions identical to those of FIG. 8A. A side frame or panel 70 is further provided at an outside of the conductive resistance sheet 60. A part for sealing between the door and the main body, an exhaust port necessary for an exhaust process, a getter port for vacuum maintenance, and the like may be placed on the side frame 70. This is because the mounting of parts is convenient in the main body-side vacuum adiabatic body, but the mounting positions of parts are limited in the door-side vacuum adiabatic body.

In the door-side vacuum adiabatic body, it is difficult to place the conductive resistance sheet 60 at a front end portion of the vacuum space part 50, i.e., a corner side portion of the vacuum space part 50. This is because, unlike the main body, a corner edge portion of the door is exposed to the exterior. If the conductive resistance sheet 60 is placed at the front end portion of the vacuum space part 50, the corner edge portion of the door is exposed to the exterior, and hence there is a disadvantage in that a separate adiabatic part should be configured so as to thermally insulate the conductive resistance sheet 60.

A conductive resistance sheet proposed in FIG. 8C may be installed in the pipeline passing through the vacuum space part 50. In FIG. 8C, portions different from those of FIGS. 8A and 8B are described in detail, and the same description is applied to portions identical to those of FIGS. 8A and 8B. A conductive resistance sheet having the same or similar shape as that of FIG. 8A, such as a wrinkled or zig-zag conductive resistance sheet 63, may be provided at a peripheral portion of the pipeline 64. Accordingly, a heat transfer path may be lengthened, and deformation caused by a pressure difference may be prevented. In addition, a separate shielding part may be provided to improve the adiabatic performance of the conductive resistance sheet.

A heat transfer path between the first and second plate members 10 and 20 will be described with reference back to FIG. 8A. Heat passing through the vacuum adiabatic body may be divided into surface conduction heat ① conducted along a surface of the vacuum adiabatic body and/or the conductive resistance sheet 60, supporter conduction heat ② conducted along the supporting unit 30 provided inside the vacuum adiabatic body, gas conduction heat ③ conducted through an internal gas in the vacuum space part 50, and radiation transfer heat ④ transferred through the vacuum space part 50.

The transfer heat may be changed depending on various design dimensions. For example, the supporting unit 30 may be changed such that the first and second plate members 10 and 20 may endure a vacuum pressure without being deformed, the vacuum pressure may be changed, the distance between the plate members 10 and 20 may be changed, and the length of the conductive resistance sheet 60 may be changed. The transfer heat may be changed depending on a difference in temperature between the spaces (the first and second spaces) respectively provided by the plate members 10 and 20. In the embodiment, a preferred configuration of the vacuum adiabatic body has been found by considering that its total heat transfer amount is smaller than that of a typical adiabatic structure formed by foaming polyurethane. In a typical refrigerator including the adiabatic structure formed by foaming the polyurethane, an effective heat transfer coefficient may be proposed as 19.6 mW/mK.

By performing a relative analysis on heat transfer amounts of the vacuum adiabatic body of the embodiment, a heat transfer amount by the gas conduction heat ③ may become the smallest. For example, the heat transfer amount by the gas conduction heat ③ may be controlled to be equal to or smaller than 4% of the total heat transfer amount. A heat transfer amount by solid conduction heat defined as a sum of the surface conduction heat ① and the supporter conduction heat ② is the largest. For example, the heat transfer amount by the solid conduction heat may reach 75% of the total heat transfer amount. A heat transfer amount by the radiation transfer heat ③ is smaller than the heat transfer amount by the solid conduction heat but larger than the heat transfer amount of the gas conduction heat. For example, the heat transfer amount by the radiation transfer heat ③ may occupy about 20% of the total heat transfer amount.

According to such a heat transfer distribution, effective heat transfer coefficients (eK: effective K) (W/mK) of the surface conduction heat ①, the supporter conduction heat ②, the gas conduction heat ③, and the radiation transfer heat ④ may have an order of Math Equation 1.

$$eK\text{solid conduction heat} > eK\text{radiation transfer heat} > eK\text{gas conduction heat} \quad \text{[Equation 1]}$$

Here, the effective heat transfer coefficient (eK) is a value that may be measured using a shape and temperature differences of a target product. The effective heat transfer coefficient (eK) is a value that may be obtained by measuring a total heat transfer amount and a temperature at least one portion at which heat is transferred. For example, a calorific value (W) is measured using a heating source that may be quantitatively measured in the refrigerator, a temperature distribution (K) of the door is measured using heats respectively transferred through a main body and an edge of the door of the refrigerator, and a path through which heat is transferred is calculated as a conversion value (m), thereby evaluating an effective heat transfer coefficient.

The effective heat transfer coefficient (eK) of the entire vacuum adiabatic body is a value given by $k=QL/A\Delta T$. Here, Q denotes a calorific value (W) and may be obtained using a calorific value of a heater. A denotes a sectional area (m2) of the vacuum adiabatic body, L denotes a thickness (m) of the vacuum adiabatic body, and $\Delta T$ denotes a temperature difference.

For the surface conduction heat, a conductive calorific value may be obtained through a temperature difference ($\Delta T$) between an entrance and an exit of the conductive resistance sheet 60 or 63, a sectional area (A) of the conductive resistance sheet, a length (L) of the conductive resistance sheet, and a thermal conductivity (k) of the conductive resistance sheet (the thermal conductivity of the conductive resistance sheet is a material property of a material and may be obtained in advance). For the supporter conduction heat, a conductive calorific value may be obtained through a temperature difference ($\Delta T$) between an entrance and an exit of the supporting unit 30, a sectional area (A) of the supporting unit, a length (L) of the supporting unit, and a thermal conductivity (k) of the supporting unit. Here, the thermal conductivity of the supporting unit 30 is a material property of a material and may be obtained in advance. The sum of the gas conduction heat ③, and the radiation transfer heat ④ may be obtained by subtracting the surface conduction heat and the supporter conduction heat from the heat transfer amount of the entire vacuum adiabatic body. A ratio of the gas conduction heat ③, and the radiation transfer heat ④ may be obtained by evaluating radiation transfer heat when no gas conduction heat exists by remarkably lowering a vacuum degree of the vacuum space part 50.

When a porous material is provided inside the vacuum space part 50, porous material conduction heat ⑤ may be a sum of the supporter conduction heat ② and the radiation transfer heat ④. The porous material conduction heat may be changed depending on various variables including a kind, an amount, and the like of the porous material.

According to an embodiment, a temperature difference $\Delta T1$ between a geometric center formed by adjacent bars 31 and a point at which each of the bars 31 is located may be preferably provided to be less than 0.5° C. Also, a temperature difference $\Delta T2$ between the geometric center formed by the adjacent bars 31 and an edge portion of the vacuum adiabatic body may be preferably provided to be less than 0.5° C. In the second plate member 20, a temperature difference between an average temperature of the second plate 20 and a temperature at a point at which a heat transfer path passing through the conductive resistance sheet 60 or 63 meets the second plate 20 may be the largest. For example, when the second space is a region hotter than the first space, the temperature at the point at which the heat transfer path passing through the conductive resistance sheet 60 or 63 meets the second plate 20 member becomes lowest. Similarly, when the second space is a region colder than the first space, the temperature at the point at which the heat transfer path passing through the conductive resistance sheet 60 or 63 meets the second plate member 20 becomes highest.

This means that the amount of heat transferred through other points except the surface conduction heat passing through the conductive resistance sheet 60 or 63 should be controlled, and the entire heat transfer amount satisfying the vacuum adiabatic body may be achieved only when the surface conduction heat occupies the largest heat transfer amount. To this end, a temperature variation of the conductive resistance sheet 60 or 63 may be controlled to be larger than that of the plate member.

Physical characteristics of the parts constituting the vacuum adiabatic body will be described. In the vacuum adiabatic body, a force by vacuum pressure is applied to all of the parts. Therefore, a material having a strength (N/m2) of a certain level may be preferably used.

Under such circumferences, the plate members 10 and 20 and the side frame 70 may be preferably made of a material having a sufficient strength with which they are not damaged by even vacuum pressure. For example, when the number of bars 31 is decreased so as to limit the support conduction heat, deformation of the plate member occurs due to the vacuum pressure, which may bad influence on the external appearance of refrigerator. The radiation resistance sheet 32 may be preferably made of a material that has a low emissivity and may be easily subjected to thin film processing. Also, the radiation resistance sheet 32 is to ensure a strength strong enough not to be deformed by an external impact. The supporting unit 30 is provided with a strength strong enough to support the force by the vacuum pressure and endure an external impact, and is to have machinability. The conductive resistance sheet 60 may be preferably made of a material that has a thin plate shape and may endure the vacuum pressure.

In an embodiment, the plate member 10 and/or 20, the side frame 70, and the conductive resistance sheet 60 or 63 may be made of stainless materials having the same strength. The radiation resistance sheet 32 may be made of aluminum having a weaker strength that the stainless materials. The supporting unit 30 may be made of resin having a weaker strength than the aluminum.

Unlike the strength from the point of view of materials, analysis from the point of view of stiffness is required. The stiffness (N/m) is a property that would not be easily deformed. Although the same material is used, its stiffness may be changed depending on its shape. The conductive resistance sheets 60 or 63 may be made of a material having a strength, but the stiffness of the material is preferably low so as to increase heat resistance and minimize radiation heat as the conductive resistance sheet 60 or 63 is uniformly spread without any roughness when the vacuum pressure is applied. The radiation resistance sheet 32 requires a stiffness of a certain level so as not to contact another part due to deformation. Particularly, an edge portion of the radiation resistance sheet may generate conduction heat due to drooping caused by the self-load of the radiation resistance sheet. Therefore, a stiffness of a certain level is required. The supporting unit 30 requires a stiffness enough to endure a compressive stress from the plate member and an external impact.

In an embodiment, the plate member 10 and/or 20 and the side frame 70 may have the highest stiffness so as to prevent deformation caused by the vacuum pressure. The supporting unit 30 and/or the bar 31 may have the second highest stiffness. The radiation resistance sheet 32 may have a stiffness that is lower than that of the supporting unit 30 but higher than that of the conductive resistance sheet 60 or 63. Lastly, the conductive resistance sheet 60 or 63 may be preferably made of a material that is easily deformed by the vacuum pressure and has the lowest stiffness.

Even when the porous material 33 is filled in the vacuum space part 50, the conductive resistance sheet 60 or 63 may preferably have the lowest stiffness, and the plate member 10 and/or 20 and the side frame 70 may preferably have the highest stiffness.

The vacuum space part 50 may resist to heat transfer by only the supporting unit 30. Here, a porous material 33 may be filled with the supporting unit 30 inside the vacuum space part 50 to resist to the heat transfer. The heat transfer to the porous material 33 may resist without applying the supporting unit 30.

In the above description, as a material suitable for the supporting unit 30, a resin of PPS has been proposed. The bar 31 is provided on the support plate 35 at gaps of 2 cm to 3 cm, and the bar 31 has a height of 1 cm to 2 cm. These resins often have poor fluidity of the resin during the molding. In many cases, the molded article does not have the designed value. Particularly, the shape of a molded product such as a bar 31 having a short length is often not provided properly due to non-uniform injection of resin into a part far from the liquid injection port of the liquid.

This may cause damage of the supporting unit 30 or defective vacuum adiabatic body later.

The supporting unit 30 is a substantially two-dimensional structure, but its area is considerably large. Therefore, if a defect occurs in one of the portions, it is difficult to discard the entire structure. This limitation becomes even more pronounced as refrigerators and warming apparatus are becoming larger in size to meet the needs of consumers.

In an embodiment, one feature in which the heat exchange pipeline is disposed outside the vacuum space part 50, i.e., the third space, is provided. The heat exchange pipeline may not be disposed in the narrow vacuum space part 50 to prevent the heat exchange pipeline from having a bad influence on the vacuum space part 50, and an effort for installing the heat exchange pipeline into the narrow vacuum space part 60 may be unnecessary.

In the following embodiments, the heat exchange pipeline refers to a pipeline area on which an inlet pipe and an outlet pipe intensively contact each other to allow the refrigerant to be heat-exchanged with each other. Although the heat exchange is performed in other areas for additional heat exchange within the range of engineering margins, it may be understood that an amount of heat exchange is relatively small. In some cases, it is understood that the heat exchange pipeline is additionally provided elsewhere, but in the embodiment, it is understood that the pipeline for the heat exchange is placed in a region that is called a heat exchange pipeline.

Figure 9:
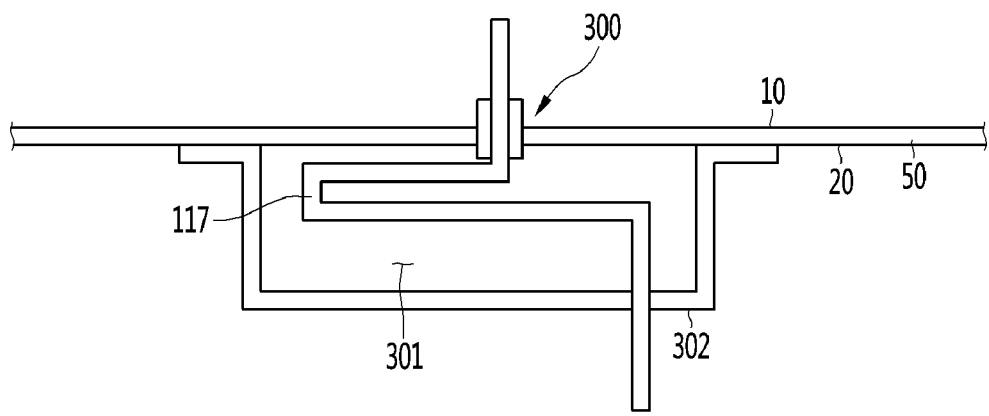
FIG. 9 is a view illustrating a configuration of an installation part of the heat exchange pipeline according to an embodiment.

FIG. 9 is a view illustrating a configuration of an installation part of the heat exchange pipeline according to an embodiment.

Referring to FIG. 9, the first plate member 10 and the second plate member 20 are provided, and a vacuum space part 50 is provided between the plate members 10 and 20. The first plate member 10 may be used as a low-temperature side wall of the refrigerator, and the second plate member 20 may be used as a high-temperature side wall of the refrigerator.

A heat exchange pipeline 117 may pass through a wall of the vacuum adiabatic body. That is to say, the heat exchange pipeline 117 may linearly pass through the first plate member 10, the vacuum space part 50, and the second plate member 20 and then be withdrawn from one space to the other space with respect to the vacuum adiabatic body. The plate members 10 and 20 through which the heat exchange pipeline 117 passes may be the same point with respect to the vacuum adiabatic body. The heat exchange pipeline 117 may not be disposed in the vacuum space part 50. When the vacuum adiabatic body is applied to the refrigerator, the vacuum adiabatic body may be withdrawn from the inside to the outside of the refrigerator.

A portion of the heat exchange pipeline 117, which passes through the wall of the vacuum adiabatic body, may be sealed by a through sealing part or seal assembly 300. The heat exchange pipeline 117 may pass through the vacuum adiabatic body without vacuum breakage of the vacuum space part 50 and the adiabatic loss by the through sealing part 300. A through sealing part or sealing assembly 300 may be a portion at which a through-part or opening is sealed as one of the through-parts provided in the wall of the vacuum adiabatic body. The through sealing part 300 may refer to a portion that is removed so that the vacuum adiabatic body passes therethrough. The through sealing part 300 may also be referred to as a plug.

The heat exchange pipeline 117 may not directly contact the plate members 10 and 20 due to the through sealing part 300. Thus, the adiabatic loss due to the unnecessary heat transfer may be reduced. In more detail, the heat exchange pipeline 117 may have a temperature that gradually increases from the inside to the outside of the refrigerator. That is, the first plate member 10 has a low temperature, and the second plate member 20 may have a high temperature. On the other hand, the heat exchange pipeline 117 may have a low temperature. Thus, when the heat exchange pipeline 117 and the second plate member 20 are heat-exchanged with each other, the adiabatic loss may occur. Thus, the above-described structure may prevent the adiabatic loss from occurring.

The through sealing part 300 will be described below in more detail with reference to other drawings.

The heat exchange pipeline 117 that is withdrawn to the outside may be configured so that an inlet pipe 171 and an outlet pipe 172 (FIG. 16) are heat-exchanged with each other in a predetermined space that is partitioned from the outside by a pipeline adiabatic case 302. The heat exchange pipeline 117 may have a bent or rolled shape so that the heat exchange pipeline 117 is intensively heat-exchanged within the pipeline adiabatic case 302.

The inside of the pipeline adiabatic case 302 may be provided as or with a pipeline adiabatic part or space 301 so that the inlet pipe 171 and the outlet pipe 172, which constitute the heat exchange pipeline 117 (FIG. 16), are heat-exchanged with each other to prevent the adiabatic loss due to the heat exchange with the outside from occurring. The pipeline adiabatic part 301 may perform an adiabatic function through vacuum, adiabatic foam, and air that is blocked from the outside. Alternatively, since the pipeline adiabatic case 302 is partitioned into the inside and outside thereof by itself, the pipeline adiabatic case 302 may perform the adiabatic function through the shielding.

According to the pipeline adiabatic case 302, when the pipeline adiabatic part 301 is in a vacuum state, the pipeline adiabatic case 302 may perform a function of maintaining the vacuum of the pipeline adiabatic part 301. For example, the pipeline adiabatic part 301 may be maintained in the vacuum state to provide a sealed structure with the plate member 20. The pipeline adiabatic case 302 may prevent moisture from being introduced into the pipeline adiabatic part 301. For example, the moisture introduced into the pipeline adiabatic part 301 may lead to deterioration of the inner members of the pipeline adiabatic part 301. According to the pipeline adiabatic case 302, the permeation of the moisture from the outside may be prevented in the beginning. According to the vacuum maintenance and the moisture blocking of the pipeline adiabatic case 302, adiabatic performance may be prevented from being deteriorated to more improve heat exchange performance and product performance.

The pipeline adiabatic case 302 may be installed on the second plate member 20, and the outer surface of the second plate member 20 may be provided as one wall of the pipeline adiabatic part 301. However, this embodiment is not limited thereto. For example, the pipeline adiabatic case 302 may be installed at a side of the first plate member 10, and the inner surface of the first plate member 10 may be provided as one wall of the pipeline adiabatic part 301. However, in this case, the space within the refrigerator may be narrowed.

At least the through sealing part 300 may be disposed inside the pipeline adiabatic part 301 and the pipeline adiabatic case 302. That is to say, the through sealing part 300 may not be exposed to the outside and may be covered by the pipeline adiabatic part 301 and the pipeline adiabatic case 302.

This will be described in more detail. A space in which the heat exchange pipeline 117 is disposed may be defined as a fourth space. The pipeline adiabatic part 301 may be disposed in the fourth space. The fourth space may be partitioned from an external first or second space by the pipeline adiabatic case 302. However, the pipeline adiabatic case 302 may be unnecessary.

The fourth space may be a space in which the heat exchange pipeline 117 is heat-exchanged. As described below, a separate filler for preventing cold air from leaking may be filled into the fourth space. The fourth space may be a space that is suitable for performing sufficient heat exchange between at least two refrigerant pipes constituting the heat exchange pipeline 117. The fourth space may be less voluminous than the third space. For example, it is difficult to intensively two-dimensionally dispose the heat exchange pipeline 117 in a narrow space due to the interference with the supporting unit 30 in the third space. On the other hand, according to an embodiment, the heat exchange pipeline 117 may be disposed in various integrated shapes without the interference. In addition, the fourth space may be intensively defined in a three-dimensional space so as to be heat-exchanged between or with only the heat exchange pipelines 117. Thus, even though the fourth space is less voluminous than the third space, the heat exchange pipeline 117 may sufficiently perform the heat exchange as a whole.

Even though the through sealing part 300 covers the refrigerant pipe with a separate adiabatic material to insulate the refrigerant pipe (see FIG. 20), thermal conductivity of the adiabatic material placed in the fourth space is greater than that of the third space that is in the vacuum state. To restrict the heat transfer through the through sealing part 300, the fourth space may cover the through sealing part 300. Thus, the cold air of the inner space of the main body, which is the first space, may be prevented from leaking.

As described above, the heat exchange pipeline 117 may perform the heat exchange operation through the contact between the inlet pipe and the outlet pipe. Here, a portion at which the inlet pipe 171 and the outlet pipe 161 (FIG. 16) contact each other is actually disposed in the fourth space. That is to say, a heat exchange area of the heat exchange pipeline 117 may be greater than that of the third space. Also, to improve space utilization of the outer space of the vacuum adiabatic body, i.e., the inner space of the main body in the case of the refrigerator and satisfy standards outside the main body, most of the heat exchange area of the heat exchange pipeline 117 may be disposed in the fourth space rather than other spaces.

The heat propagating along the heat exchange pipeline 117 may cause the adiabatic loss. For example, the vacuum breakage of the vacuum space part 50 may not occur by the through sealing part 300, and an air flow to the outside of the refrigerator may be blocked to reduce the adiabatic loss. However, a case in which heat conducted to the inside of the refrigerator along the heat exchange pipeline 117 by using the first plate member 10 as a boundary is not sufficiently blocked may occur in designing a refrigeration system. In this case, the pipeline adiabatic part 301 and the pipeline adiabatic case 302 may be further installed at a side of the first plate member 10. In some cases, a small-sized adiabatic member rather than a large-sized constitution reaching the pipeline adiabatic part 301 and the pipeline adiabatic case 302 may be implemented. It is to be understood that the adiabatic member is provided on both the plate members 10 and 20 in the following other embodiments.

However, the adiabatic loss affected in the inside of the refrigerator may be reduced by only the pipeline adiabatic part 301 and the pipeline adiabatic case 302, which are provided inside the second plate member 20, through sufficient examination of the refrigeration system.

According to this embodiment, the influence exerted on the vacuum space part 50 by the heat exchange pipeline 117 may be reduced in the beginning, and the limitation in which the vacuum adiabatic body is not repaired later due to the sealing of the vacuum adiabatic body may be solved.

Figure 10:
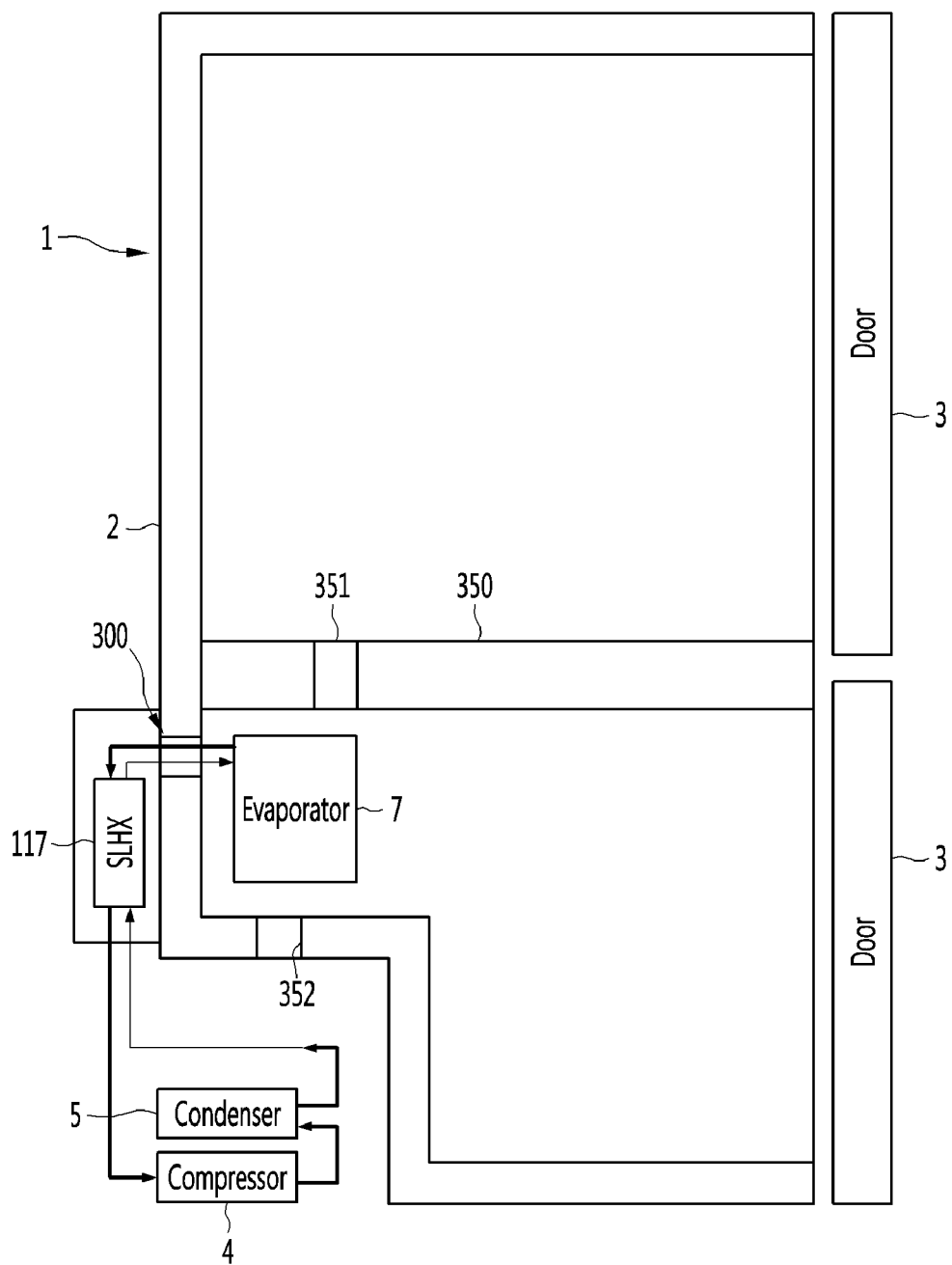
FIG. 10 is a view of a refrigerant to which the installation part of the heat exchange pipeline of FIG. 9 is applied according to an embodiment.

FIG. 10 is a view of the refrigerant to which the installation part of the heat exchange pipeline of FIG. 9 is applied according to an embodiment. In the refrigerator of FIG. 10, the single vacuum adiabatic body is divided into two spaces by a partition wall 350. The two spaces may be opened and closed by separate doors, and a single evaporator may be provided to supply cold air into the two spaces.

Referring to FIG. 10, a single main body 2 provided by the single adiabatic body may be divided into two spaces, and the two spaces may be opened and closed by separate doors 3. The two spaces may operate in an upper-refrigerating and lower-freezing manner. The partition wall 350 may be provided in at least one of a manner in which an adiabatic unit that is a foaming member is filled or a shield manner in which an inner space is shielded from the outside.

Figure 16:
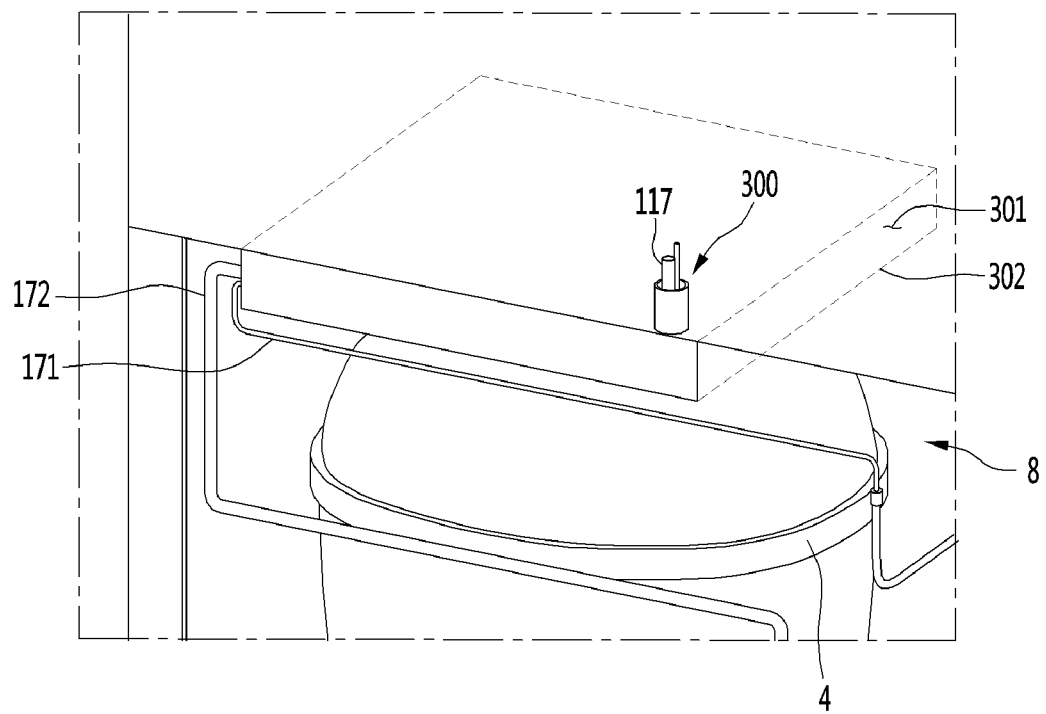
FIG. 16 is a perspective view of the embodiment of FIG. 15.

An evaporator 7 is disposed in the freezing space of the two spaces. The cold air supplied to the evaporator 7 may be supplied from the inlet pipe 171 (FIG. 16) via a compressor 4 and a condenser 5. The inlet pipe 171 may serve as an expansion device. A refrigerant evaporated in the evaporator 7 is discharged through the outlet pipe 172 (FIG. 16). It has already been explained that the heat exchange pipeline 117 in which the inlet pipe 171 and the outlet pipe 172 are exchanged with each other is provided outside the refrigerator.

The heat exchange pipeline 117 is disposed in a separate space having one surface extending along the outer surface of the vacuum adiabatic body as a substantial wall outside the vacuum adiabatic body providing the wall of the refrigerator. The heat exchange pipeline 117 may be the same as the above-described heat exchange pipeline 117 in that the thermal insulation is realized by the pipeline adiabatic part 301 and the pipeline adiabatic case 302 (FIG. 9).

A cold air passage 351 may be provided in the partition wall 350. The cold air passage 351 may be a passage through which cold air generated in the evaporator 7 is transferred from the space, in which the evaporator 7 is disposed, to the other space. To remove defrosting water generated in the evaporator 7 to the outside of the main body 2, a defrosting water pipeline 352 may be further provided in the vacuum adiabatic body.

The through sealing part 300 may be provided on a position at which the heat exchange pipeline 117 passes through the main body 2 to prevent heat from being transferred to the inside and outside of the refrigerator. Also, the pipeline adiabatic part 301 and the pipeline adiabatic case 302 may cover the through sealing part 300 to more firmly prevent the cold air from being lost.

In FIG. 10, a thick solid line indicates a copper pipe, which has an inner diameter of about 3 millimeters or more. A thin solid line represents a thin pipeline having a diameter of about 1 millimeter or less as a capillary.

Figure 11:
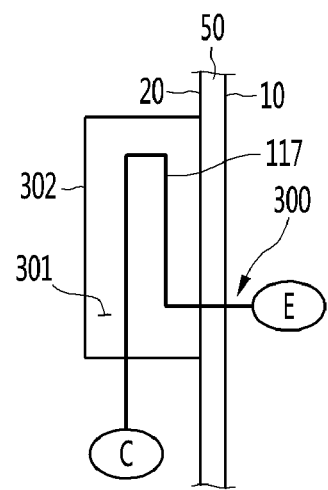
FIG. 11 is a conceptual view of the embodiment of FIG. 10 with respect to a path of the heat exchange pipeline.

FIG. 11 is a more clear conceptual view of the embodiment of FIG. 10 with respect to a path of the heat exchange pipeline.

Referring to FIG. 11, the heat exchange pipeline 117 is shielded from the outside by the pipeline adiabatic part 301 and the pipeline adiabatic case 302, which are disposed on the outer surface of the vacuum adiabatic body 1. In this state, the inlet pipe 171 and the outlet pipe 172 (FIG. 16), which constitute the heat exchange pipeline 117, may be heat-exchanged with only each other to reduce the adiabatic loss.

The through sealing part 300 may be covered and protected by the pipeline adiabatic part 301 and the pipeline adiabatic case 302.

According to the above-described constituents, the heat exchange pipeline 117 may sufficiently generate thermal energy between the condenser C and the evaporator E to reuse the thermal energy.

Since the heat exchange pipeline is not disposed in the vacuum space part 50, the vacuum breakage of the vacuum space part 50 and the difficulty in repair of the heat exchange pipeline may be prevented in the beginning.

Figure 12:
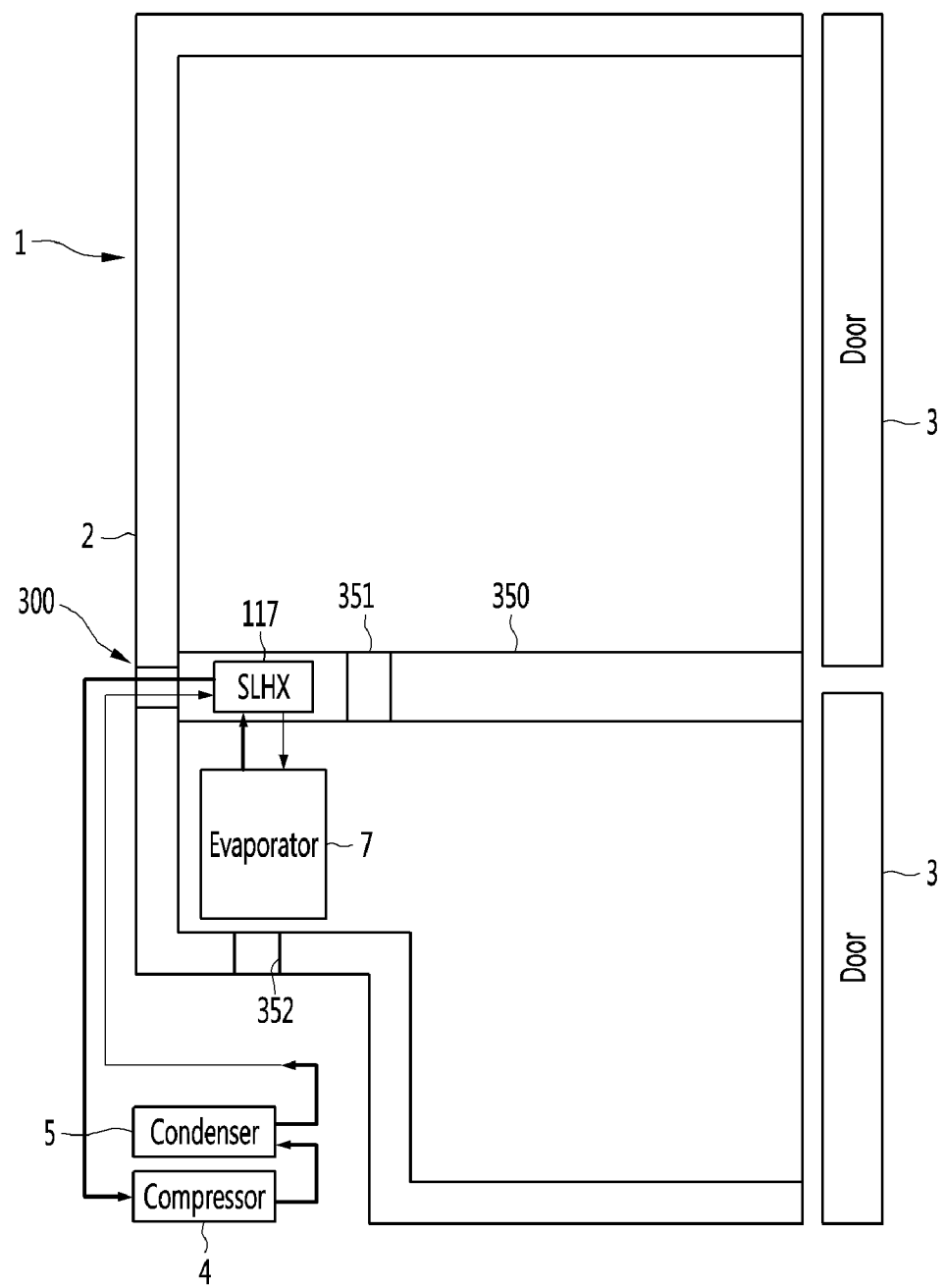
FIG. 12 is a view of a refrigerant to which an installation part of a heat exchange pipeline is applied according to another embodiment.

FIG. 12 is a view of a refrigerant to which an installation part of a heat exchange pipeline is applied according to another embodiment. Other constituents according to an embodiment of FIG. 12 are the same as those according to an embodiment of FIG. 10 except for installation of a heat exchange pipeline and a peripheral portion of the heat exchange pipeline, and thus, non-explained constituents will be derived from the descriptions of the embodiment of FIG. 10.

Referring to FIG. 12, in this embodiment, a heat exchange pipeline 117 is disposed in a partition wall 350. For example, the heat exchange pipeline 117 may be disposed within the partition wall 350. The partition wall 350 is configured to thermally insulate two spaces within a main body 2. Thus, a separate adiabatic constituent, which is provided as only the heat exchange pipeline 117, for example, a pipeline adiabatic part 301 and a pipeline adiabatic case 302 may not be separately provided. The constituents of the partition wall 350 may be provided as adiabatic constituents of the heat exchange pipeline 117.

The heat exchange pipeline 117 connected to the evaporator 7 may perform heat exchange between the inlet pipe 171 and the outlet pipe 172 (FIG. 16) in the partition wall 350 and then be withdrawn to the outside of a main body 2 by passing through a through sealing part 300.

In this embodiment, it is unnecessary to separately provide the pipeline adiabatic part 301 and the pipeline adiabatic case 302 outside the refrigerator. Thus, the inner and outer spaces of the refrigerator may be more efficiently utilized. In addition, since the adiabatic constituents of the partition wall 350 are used together with the adiabatic constituents of the heat exchange pipeline 117, the space utilization may be improved.

Figure 13:
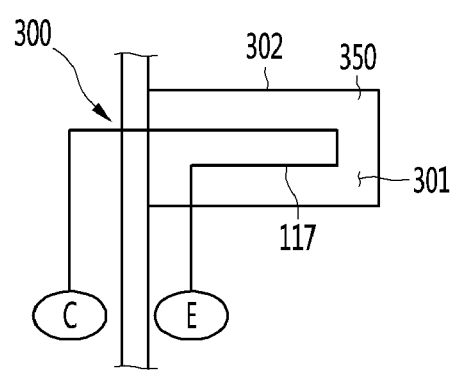
FIG. 13 is a conceptual view of the embodiment of FIG. 12 with respect to a path of the heat exchange pipeline.

FIG. 13 is a more clear conceptual view of the embodiment of FIG. 12 with respect to a path of the heat exchange pipeline.

Referring to FIG. 13, the constituents of the partition wall 350 may serve as the adiabatic constituents of the heat exchange pipeline 117, respectively. As an outer surface structure of the partition wall 350, an outer case made of a resin material may act as the pipeline adiabatic case 302, and an adiabatic member made of a foamed resin material provided into the partition wall 350 may act as the pipeline adiabatic part 301.

The inlet pipe 171 and the outlet pipe 172 (FIG. 16), which constitute the heat exchange pipeline 117, may be heat-exchanged with only each other to reduce a adiabatic loss.

The through sealing part 300 may be covered and protected by the partition wall 350. As described above, a separate adiabatic structure may be provided at a side of the second plate member 20 adjacent to the through sealing part 300.

According to the above-described constituents, the heat exchange pipeline 117 may sufficiently generate thermal energy between the condenser C and the evaporator E to reuse the thermal energy.

According to the above-described constituents, since a constituent for separately installing the heat exchange pipeline outside the refrigerator is not required, the configuration may be simplified, and the refrigerator may be reduced in size. Alternatively, various advantages due to the absence of the heat exchange pipeline in the vacuum space part 50 may be obtained as in the previous embodiments.

Figure 14:
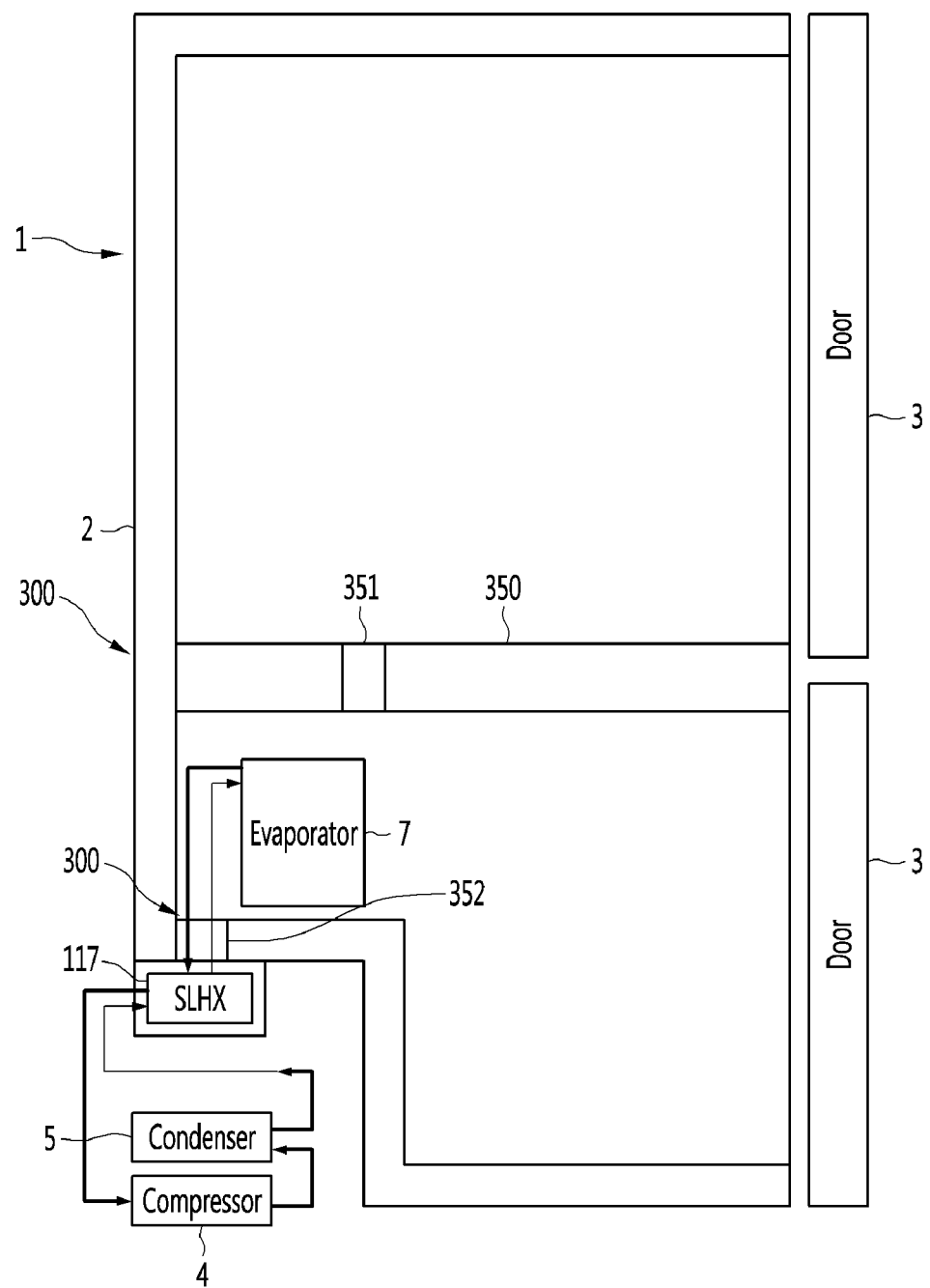
FIG. 14 is a view of a refrigerant to which an installation part of a heat exchange pipeline is applied according to further another embodiment.

FIG. 14 is a view of a refrigerant to which an installation part of a heat exchange pipeline is applied according to further another embodiment. Other constituents according to an embodiment of FIG. 14 are the same as those according to an embodiment of FIGS. 10 and 12 except for installation of a heat exchange pipeline and a peripheral portion of the heat exchange pipeline, and thus, non-explained constituents will be derived from the descriptions of the embodiment of FIGS. 10 and 12.

Referring to FIG. 14, in this embodiment, a heat exchange pipeline 117 is disposed in a machine room 8. Since the heat exchange pipeline 117 is disposed in an inner space of the machine room 8, the pipeline adiabatic part 301 and the pipeline adiabatic case 302 may be provided to sufficiently perform heat exchange between the two pipelines disposed in the heat exchange pipeline 117.

In this embodiment, a defrosting water pipeline 352 and a through sealing part 300, which are required for driving an evaporator 7, may be achieved by a single through-structure. An inlet pipe 171, an outlet pipe 172 (FIG. 16), and the defrosting water pipeline 352 may pass together through the single through sealing part 300 through which the vacuum adiabatic body passes. Thus, according to another embodiment, since the single through-part sufficiently serves as the through-parts, which are disposed to be spaced apart from each other at two positions, the adiabatic loss may be reduced, and the fear of failure due to the vacuum breakage may be reduced.

In this embodiment, since the heat exchange pipeline 117 is installed in the inner space of the machine room 8 (FIG. 2), the machine room 8 may be efficiently utilized, and the refrigerator may not increase in size, thereby more efficiently utilizing a space outside the refrigerator.

Figure 15:
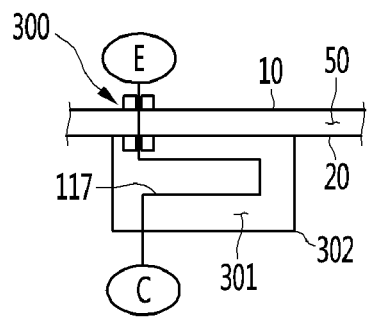
FIG. 15 is a conceptual view of the embodiment of FIG. 14 with respect to a path of the heat exchange pipeline.

FIG. 15 is a more clear conceptual view of the embodiment of FIG. 14 with respect to a path of the heat exchange pipeline.

Referring to FIG. 15, the heat exchange pipeline 117 is disposed in the inner space of the machine room 8. The heat exchange pipeline 117 may perform heat exchange between the inlet pipe 171 and the outlet pipe 172 (FIG. 16) regardless of a thermal state of the machine room 8 (FIG. 2) by the pipeline adiabatic case 302 and the pipeline adiabatic part 301.

According to the above-described constituents, the heat exchange pipeline 117 may sufficiently generate thermal energy between the condenser C and the evaporator E to reuse the thermal energy. Particularly, a distance between the evaporator E and the condenser C may decrease. Thus, an irreversible loss such as pressure drop due to the unnecessary pipeline length may be reduced to improve efficiency of the refrigeration system, and an additional component for the insulation of the unnecessary pipeline may not be required.

FIG. 16 is a perspective view illustrating a state in which the embodiment of FIG. 15 is actually realized.

Referring to FIG. 16, the pipeline adiabatic part 301 and the pipeline adiabatic case 302 are disposed in the machine room 8, and the heat exchange pipeline 117 is disposed in the pipeline adiabatic case 302. The heat exchange pipeline 117 may be bent in a zigzag shape and extend in a direction of a plane of the plate member to secure a path for the heat exchange.

The through sealing part 300 may pass through the vacuum adiabatic body, and the heat exchange pipeline 117 may pass through the inside of the through sealing part 300. Although the defrosting water pipeline 352 (FIG. 14) passes through the through sealing part 300, this is not illustrated in the drawing.

The inlet pipe 171 providing one pipeline of the heat exchange pipeline 117 may be connected to the condenser 5 within the machine room 8 as a capillary, and the outlet pipe 172 providing the other pipeline may be connected to the compressor 4 as a copper pipeline having a large diameter.

In the embodiment of FIG. 16, when a temperature distribution of the pipeline adiabatic part 301 is observed, a temperature of the through sealing part 300 is low, and also, a temperature gradually increases in a direction in which the heat exchange pipeline 117 extends to the inside of the pipeline adiabatic part 301. In detail, in FIG. 16, the temperature of a right lower portion of the pipeline adiabatic part 301 on which the through sealing part 300 is disposed may be the lowest, and a temperature of a left lower portion may be the highest. In the above-described thermal arrangement, a non-uniform temperature distribution may occur in the pipeline adiabatic part 301 to deteriorate heat exchange efficiency of the heat exchange pipeline and significantly cause heat leakage.

Figure 17:
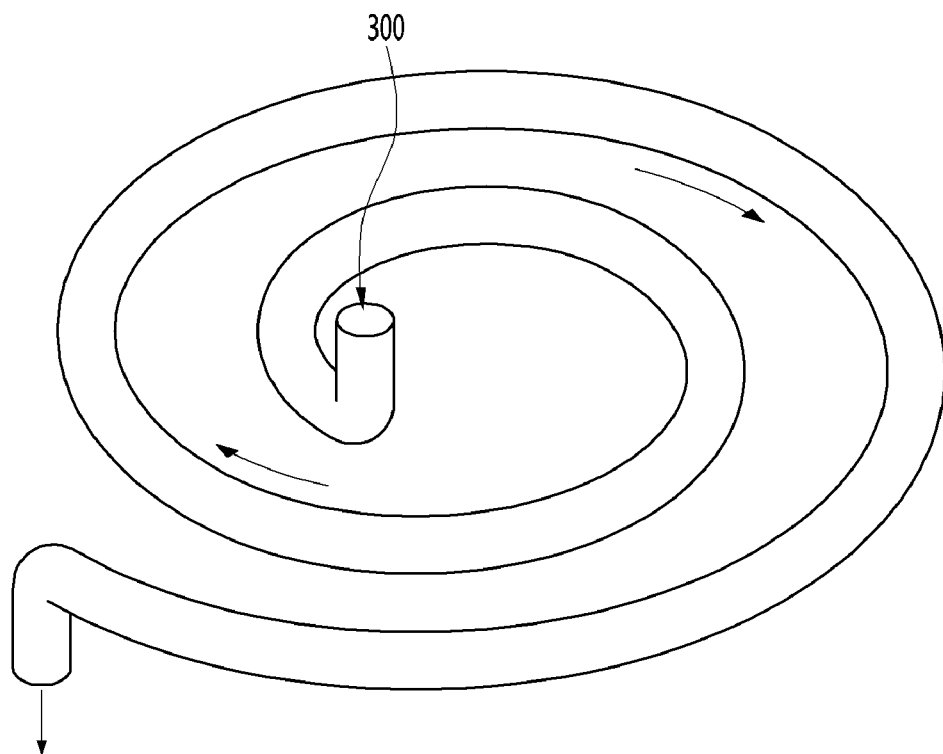
FIG. 17 is a view illustrating an arrangement of the heat exchange pipeline in which a limitation of FIG. 16 is solved.

FIG. 17 is a view illustrating an arrangement of the heat exchange pipeline in which the above-described limitation is solved.

Referring to FIG. 17, in the arrangement of the heat exchange pipeline 117, the through sealing part 300 may be disposed at a center of the heat exchange pipeline 117. A pipeline connected to the evaporator E (FIG. 15) may move through the through sealing part 300. In the arrangement of the heat exchange pipeline 117, the other point at which the heat exchange pipeline 117 is connected to the outside of the pipeline adiabatic part 301 may be disposed at the outermost side. The heat exchange pipeline 117 may be wound while gradually increasing in diameter with respect to a center of the through sealing part 300. According to the above-described configuration, a temperature of a central portion of the heat exchange pipeline 117 may be the lowest, and a temperature may gradually increase toward the outside. Thus, the pipeline adiabatic part 301 may have a uniform temperature distribution to improve heat exchange efficiency of the heat exchange pipeline and reduce a heat loss.

Since the inlet pipe 171 and the outlet pipe 172 (FIG. 16) generate a counter current flow in the heat exchange pipeline 117, a spacing part between the heat exchange pipelines 117 may be insulated by the pipeline adiabatic part 301 to prevent unnecessary heat exchange of the heat exchange pipeline 117 from occurring.

An arrow indicates a flow of an evaporated refrigerant flowing through the inside of the outlet pipe 172 that is withdrawn from the evaporator E having a low temperature.

In the embodiment of FIG. 17, an arrangement of a central portion having the lowest temperature (where a thermal influence of the outlet pipe 172 is most dominant) and the outermost portion having the highest temperature (where a thermal influence of the inlet pipe 171 is most dominant) may be optimized. In addition, the through sealing part 300 is disposed at the central portion, which passes through the first and second plate members 10 and 20, and the heat exchange pipeline 117 may be withdrawn to the outside while rotating or spiraling and have a diameter that gradually increases. The central portion may protrude outward from the spiral and be at one end of the spiral, while an outer portion, which may be at the other end of the spiral, passes through the pipeline adiabatic case 302. According to the arrangement of the heat exchange pipeline 117, the temperature distribution of the pipeline adiabatic part 301 may be radially uniform when viewed from the center. Thus, the heat exchange efficiency may be improved, and the heat leakage may be reduced.

In the arrangement of the heat exchange pipeline of FIG. 17, to obtain the bent efficiency, the pipeline adiabatic part 301 may be insulated.

Figure 18:
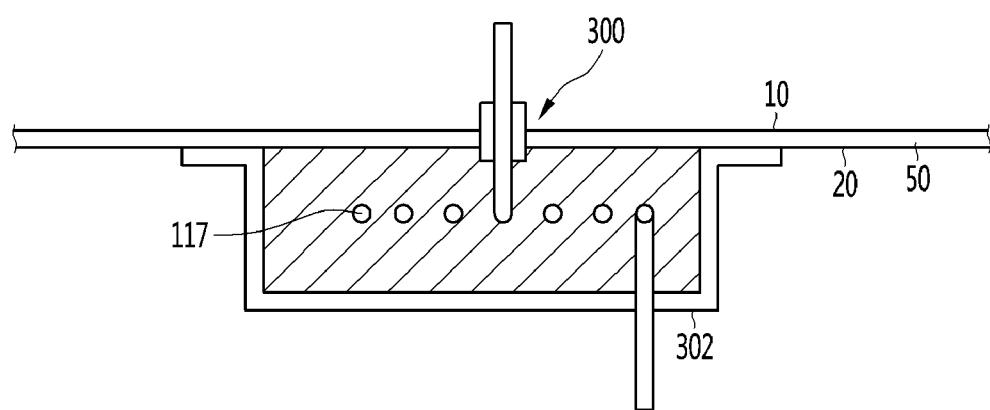
FIG. 18 is a view for explaining an adiabatic structure of the heat exchange pipeline provided in FIG. 17.

FIG. 18 is a cross-sectional view for explaining an adiabatic structure of the heat exchange pipeline provided in FIG. 17.

Referring to FIG. 18, in the pipeline adiabatic part 301, the inner space of the pipeline adiabatic case 302 may be filled in a manner such as polystyrene foaming. The pipeline adiabatic part 301 may be configured so that the inlet pipe 171 and the outlet pipe 172, which constitute the heat exchange pipeline 117, may accurately perform counter current heat exchange at a predetermined position. In addition, the heat exchange pipeline 117 may be wound so a diameter thereof increases toward the outside to achieve thermal equilibrium.

Although the heat exchange pipeline 117 is shown to be wound to form one layer, the heat exchange pipeline 117 may alternative be wound to form two layers or three layers.

Figure 19:
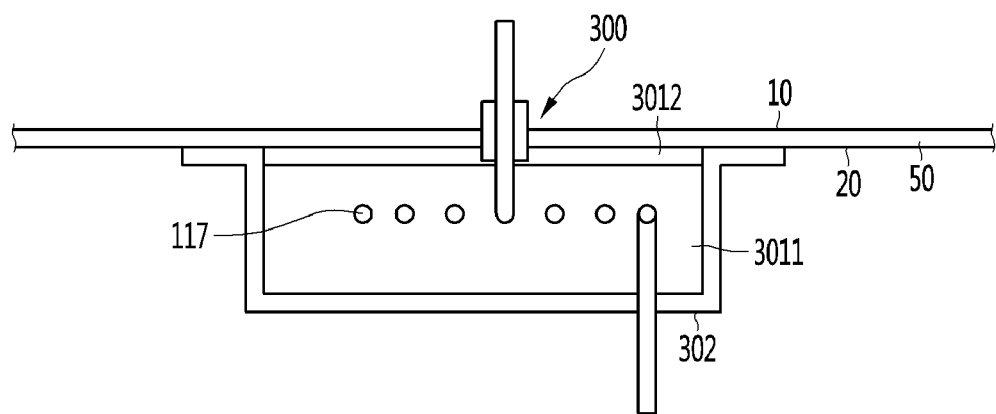
FIG. 19 is a view for explaining another example of the adiabatic structure of the heat exchange pipeline of FIG. 17.

FIG. 19 is a view for explaining another example of the adiabatic structure of the heat exchange pipeline of FIG. 17.

Referring to FIG. 19, the pipeline adiabatic part 301 may be provided in a vacuum state to provide a pipeline vacuum part or space 3011. A vacuum plate 3012 is additionally provided to a side of the second plate member 20 in the pipeline adiabatic case 302 to maintain the vacuum state within the pipeline vacuum part 3011. The vacuum plate 3012 may cover the through sealing part 300 to maintain sealing. As a result, the cold air within the refrigerator and an air pressure within the refrigerator may not have an influence on the pipeline vacuum part 3011.

Hereinafter, the through sealing part 300 will be described.

The through sealing part 300 may be a constitute that is installed at a point at which the heat exchange pipeline 117 passes through the vacuum adiabatic body and provided to prevent or reduce heat from being transferred to the inside and outside that are partitioned by the vacuum adiabatic body.

Figure 20:
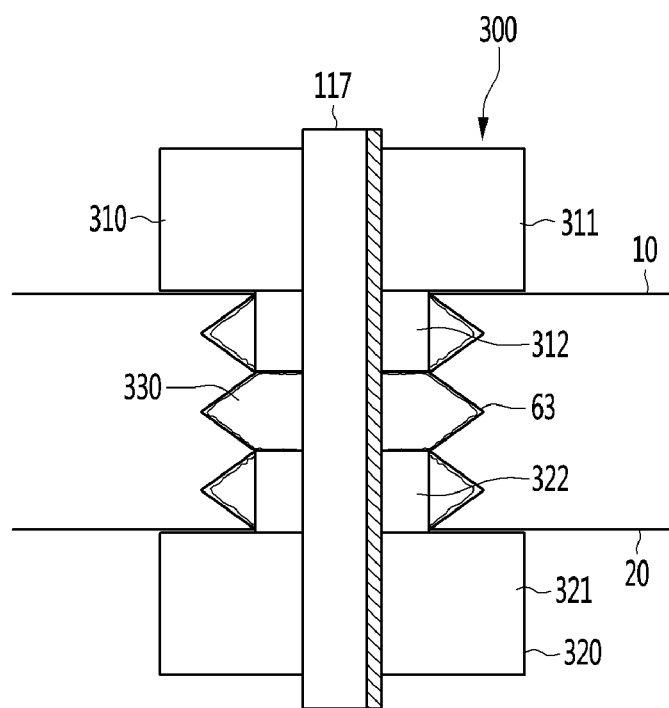
FIG. 20 is a cross-sectional view illustrating a configuration of a through sealing part.

FIG. 20 is a cross-sectional view illustrating a configuration of the through sealing part 300.

Referring to FIG. 20, the vacuum space part 50 is provided in the spacing part between the plate members 10 and 20. A wrinkled conductive resistance sheet 63 illustrated in FIG. 8C may be provided as a constitute that covers a through-part or space passing through the plate members 10 and 20 The wrinkled conductive resistance sheet 63 may resist to thermal conduction between the plate members 10 and 20 and prevent the members 10 and 20 from being damaged by a pressure difference between a vacuum pressure and an atmospheric pressure. Both ends of the wrinkled conductive resistance sheet 63 may be welded to the plate members 10 and 20, and thermal conduction may be further prevented by the wrinkle shape of the wrinkled conductive resistance sheet 63.

The heat exchange pipeline 117 passes through an inner space of the wrinkled conductive resistance sheet 63. Blocks 310 and 320 may be disposed on upper and lower ends of the heat exchange pipeline 117 to block opened portions. The blocks 310 and 320 may be made of a soft material having a low heat conductive coefficient.

The blocks 310 and 320 will be described in detail. The blocks 310 and 320 may be provided as a pair of members, which perform the same function. Although any one member is described, the description may be equally applied to the other member.

An outer supporter 311, which contacts an outer surface of the first plate member 10 to seal a gap or opening between sides of the first plate member 10 and/or to help seal the vacuum space part 50 between the first and second plate members 10 and 20 is provided in the first block 310 provided at a side of the first plate member 10, i.e., in the inside of the refrigerator. An inner pusher 312 having a shape corresponding to a cross-sectional shape of the wrinkled conductive resistance sheet 63 may be further provided inside the outer supporter 311.

The inner pusher 312 may compress a sealing member 330 to fill the inner space of the wrinkled conductive resistance sheet 63. The sealing member 330 may be made of a material that is curable after a predetermined time elapses as a fluid such as liquid silicon. According to the sealing member 330, the entire gap or vacuum space part 50 excluding the inner pushers 312 and 322 and the heat exchange pipeline 117 may be sealed in the inner space of the wrinkled conductive resistance sheet 63.

The description of the outer supporter 311 is similarly applied to the outer supporter 321 of the second block 320, and the description of the inner pusher 312 is similar for the inner pusher 322 of the second block 320. The sealing member 330 may be condensed via the inner pusher 312 of the first block 310 at a first side, and the inner pusher 322 of the second block 320 at a second side.

The through sealing part 300 having the above-described structure may shield a flow and heat transfer of a gas passing through the inside and the outside of the vacuum adiabatic body even though the heat exchange pipeline 117 passes through the vacuum adiabatic body.

FIGS. 21A, 21B, 22A, and 22B are views illustrating a process of manufacturing the through sealing part.

Figure 21A:
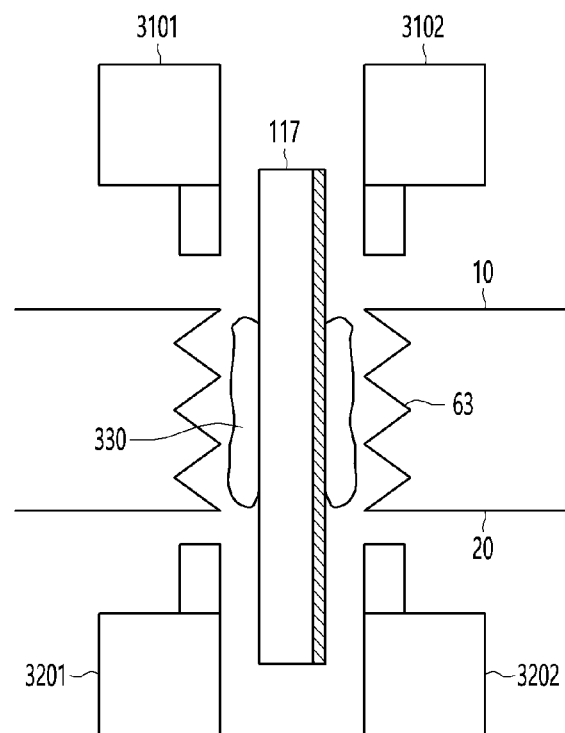
FIGS. 21A, 21B, 22A, and 22B are views illustrating a process of manufacturing the through sealing part.
Figure 21B:
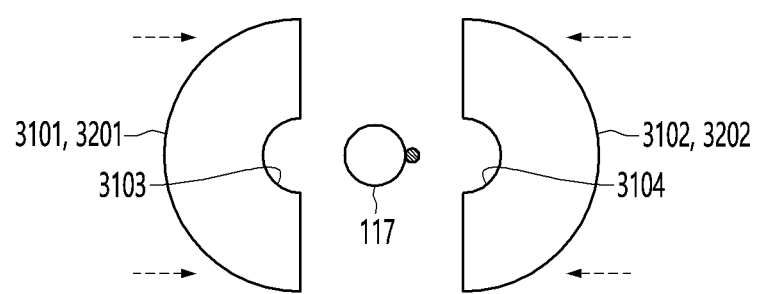

First, referring to FIGS. 21A and 21B, an FIG. 21A illustrates a side view, and FIG. 21B illustrates a plan view.

The blocks 310 and 320 may be divided into first or one-side blocks 3101 and 3201 and second or the other side blocks 3102 and 3202. The first block 310 will be described as an example, and the same description will be equally applied to the second block 320.

The first block 310 may be divided into one-side block 3101 and the other-side block 3102 to surround the heat exchange pipeline 117. When the first block 310 is provided as a single body, the first block may be inserted from an end of the heat exchange pipeline 117 so as to be guided to a proper position. However, it is not desirable because it causes difficulty in work. In FIG. 21B, arrows indicate that one-side block 3101 and the other-side block 3102 are approaching to the heat exchange pipeline 117 to surround the heat exchange pipeline 117. Predetermined grooves 3103 and 3104 may be defined in the blocks so that the one-side block and the other-side block surround the heat exchange pipeline 117.

In FIG. 21B, dotted lines indicate the corresponding positions of a vertical cross-section and a horizontal cross-section, and a relative position of the heat exchange pipeline 117 and the blocks 310 and 320 may be understood together.

A sealing member 330 may be inserted as a fluid in the inner space of the wrinkled conductive resistance sheet 63. The sealing member 330 may be provided to surround an outer surface of the heat exchange pipeline 117. The sealing member 330 may prevent the heat exchange pipeline 117 from contacting the wrinkled conductive resistance sheet 63 to sufficiently perform the function of the thermal conductive resistance by the conductive resistance sheet 53. Thereafter, the blocks 310 and 320 are pushed into the wrinkled conductive resistance sheet 63. Explanation will be given while changing the drawing.

Figure 22A:
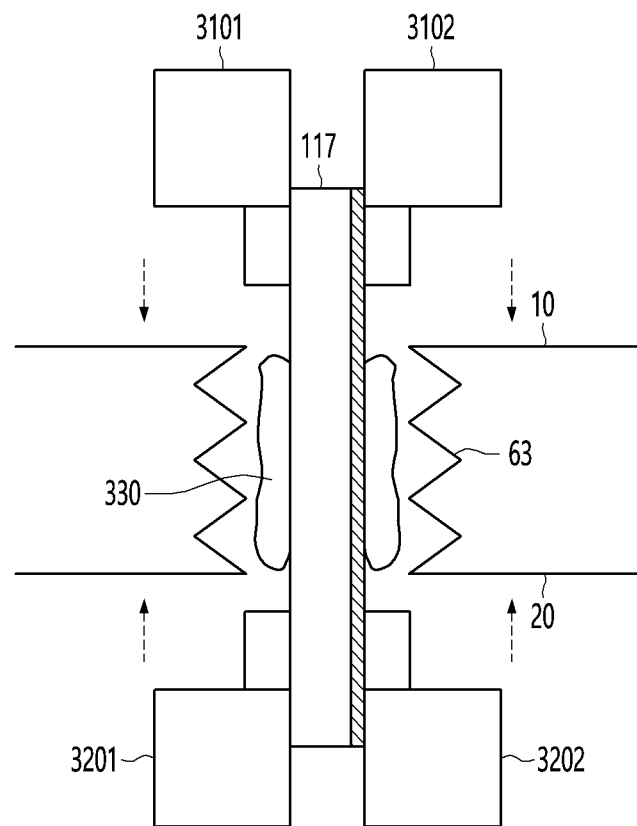
Figure 22B:
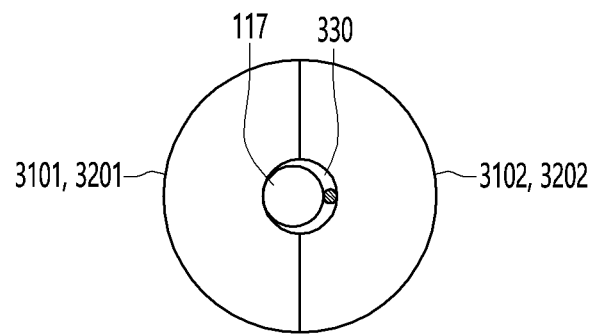

Referring to FIGS. 22A and 22B, FIG. 22A illustrates a side view, and FIG. 22B illustrates a plan view.

The first and second blocks 310 and 320 are inserted into the wrinkled conductive resistance sheet 63. An arrow indicates a moving direction of the blocks 310 and 320.

Since the first and second blocks 310 and 320 are at least partially inserted into the wrinkled conductive resistance sheet 63, the sealing member 330 may be deformed to move to the spacing part between the heat exchange pipe 117 and the conductive resistance sheet 63 so as to be filled into the spacing part. Here, the inner pushers 312 and 322 may perform a function of a plunger that pushes and compresses the sealing member 330.

When the blocks 310 and 320 are sufficiently inserted into the wrinkled conductive resistance sheet 63, the sealing member 330 may be filled into the spacing part between the grooves 3103 and 3104 of the blocks and the heat exchange pipeline 117. Since the heat exchange pipeline 117 may be provided as a pair of pipes 171 and 172, it may be difficult to provide the grooves 3013 and 3104 so as to match outer appearances of the pipes 171 and 172. Due to this limitation, the occurrence of the sealing member 330 may be convenient in terms of production to prevent a gap between the grooves of the blocks 310 and 320 and the heat exchange pipeline 117 from occurring. However, in the case in which the single pipeline is provided, the sealing member 330 330 as in the embodiment may still be applied. The gap filled with the sealing member 330 may be more narrowed to realize a more superior sealing effect.

An arrow of FIG. 22 indicates that the inner pushers 312 and 322 push the sealing member 330 to seal the inside of the wrinkled conductive resistance sheet 63.

According to the through sealing part 300, the heat exchange pipeline 117 may perform the sealing on the inside and outside of a portion at which the heat exchange pipeline 117 passes through the vacuum adiabatic body, and heat transfer between the inside and the outside of the vacuum adiabatic body may be reduced.

The through sealing part 300 may block heat transferred through the through-part of the vacuum adiabatic body together with the pipeline adiabatic part 301. A mutual relationship between the through sealing part 300 and the pipeline adiabatic part 301 will be described by changing the drawing.

FIGS. 23 to 26 are views illustrating the mutual relationship between the through sealing part 300 and the pipeline adiabatic part 301.

Figure 23:
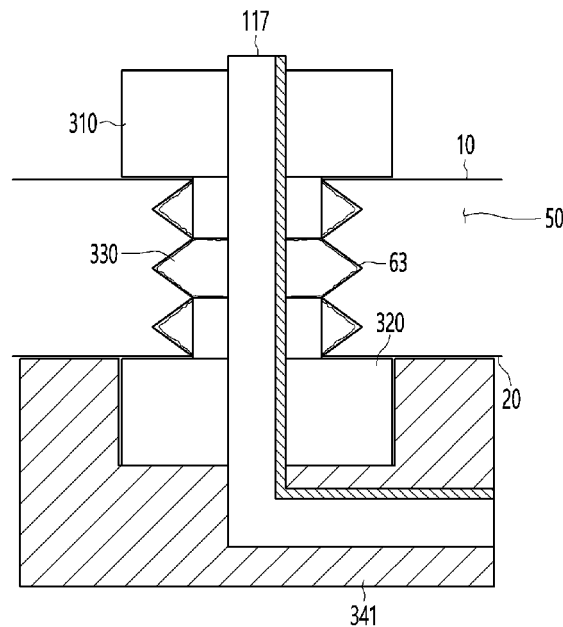
FIGS. 23 to 26 are views illustrating a mutual relationship between the through sealing part and the pipeline adiabatic part.

First, referring to FIG. 23, the pipeline adiabatic part 301 may provide a forward pipeline adiabatic part or space 341 having the through sealing part 300 at a center thereof. The adiabatic part 341 may expand in a forward direction along a plane perpendicular or forward from the plate member 20, while a portion of the heat exchange pipeline 117 may spiral inside of a plane that is parallel to a plane along the second plate member 20, as previously described with reference to FIG. 17. The forward pipeline adiabatic part 341 may be preferably applied to the heat exchange pipeline of FIG. 17.

The forward pipeline adiabatic part 341 may be attached to the second block 320 and/or the second plate member 20 and/or the heat exchange pipeline 117 or be foamed into an inner space of a predetermined case.

Figure 24:
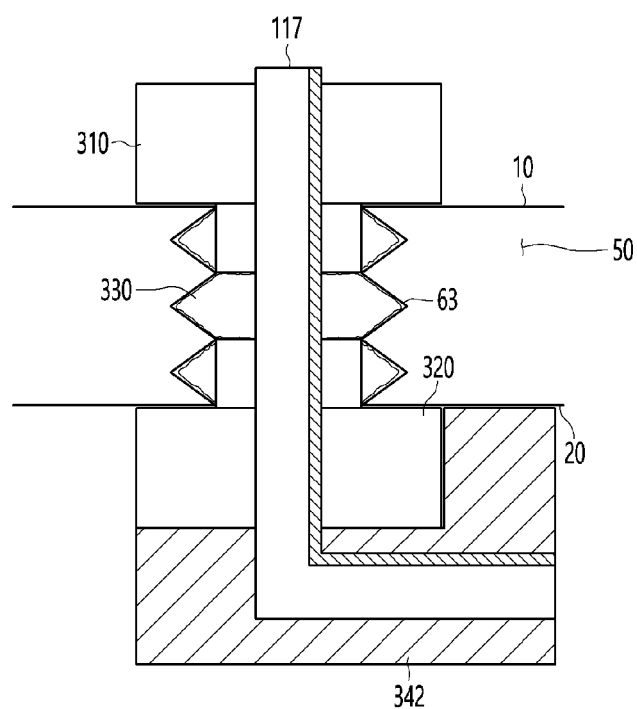

Referring to FIG. 24, the pipeline adiabatic part 301 may provide a one-way pipeline adiabatic part or space 342 extending in one direction of the through sealing part 300. The one-way pipeline adiabatic part 342 may be preferably applied to the heat exchange pipeline 117 of FIG. 16.

The one-way pipeline adiabatic part 341 may be attached to the second block and/or the second plate member 20 and/or the heat exchange pipeline 117 or be foamed into an inner space of a predetermined case.

Figure 25:
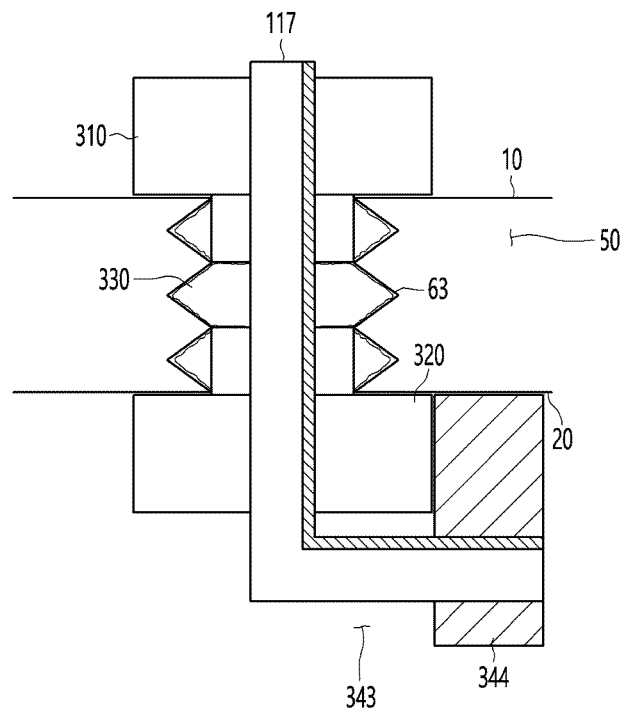

Referring to FIG. 25, the pipeline adiabatic part 301 may provide a one-side adiabatic part or space 344 provided at one side along the heat exchange pipeline 117 apart from the through sealing part 300. The one-side adiabatic part 344 may be fixed to the block 320 and/or the heat exchange pipeline 117 and/or the second plate member.

The other space through which the heat exchange pipeline 117 passes may provide an opening adiabatic part or space 343 so that the other space is separated from the vacuum space 50 and other spaces by the pipeline adiabatic case 302 to perform an adiabatic function.

Figure 26:
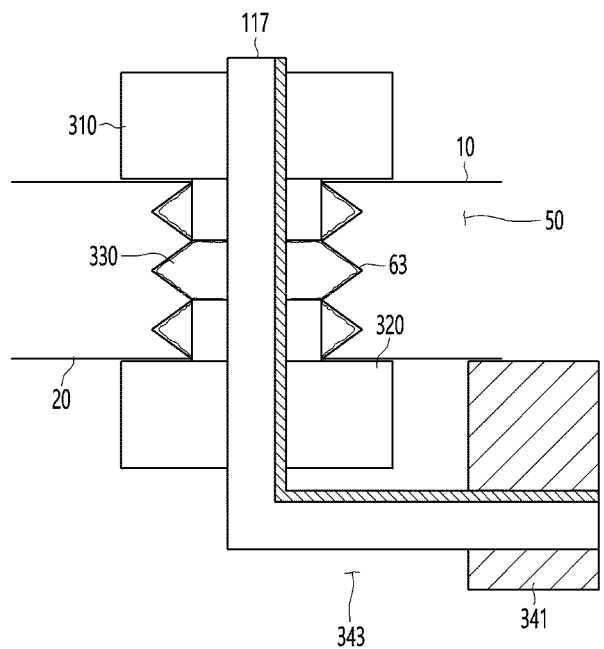

Referring to FIG. 26, unlike the case of FIG. 26, the one-side adiabatic part 344 may be provided to be separated from the block 320. This case may be applied to a case in which additional heat exchange between the inlet pipe 171 and the outlet pipe 172 is required when the heat exchange performance of the heat exchange pipeline 117 is insufficient.

The cases of FIGS. 25 and 26 may be preferably applied to obtain the adiabatic effect as a simple constitute when the thermal insulation to the first plate member 10 is required.

Figure 27:
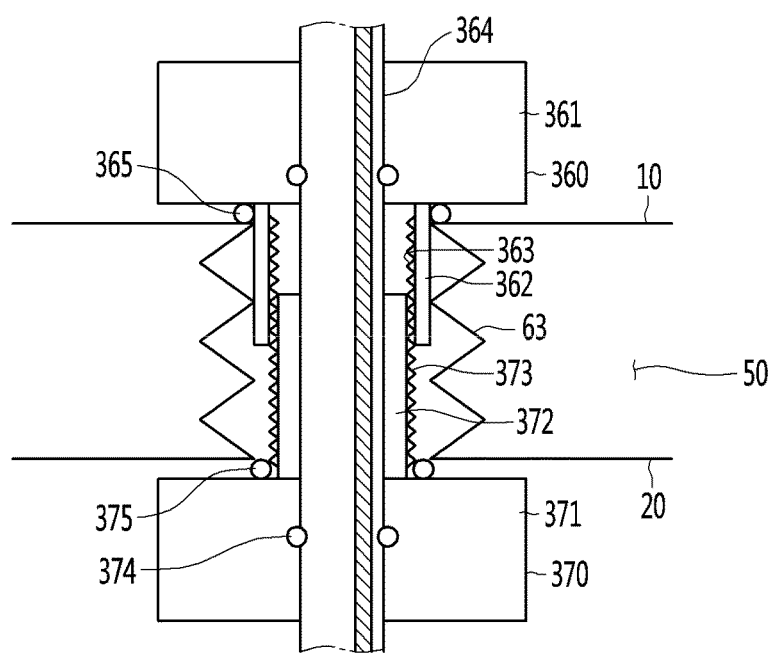
FIGS. 27 and 28 are views of a through sealing part or assembly according to another embodiment.
Figure 28:
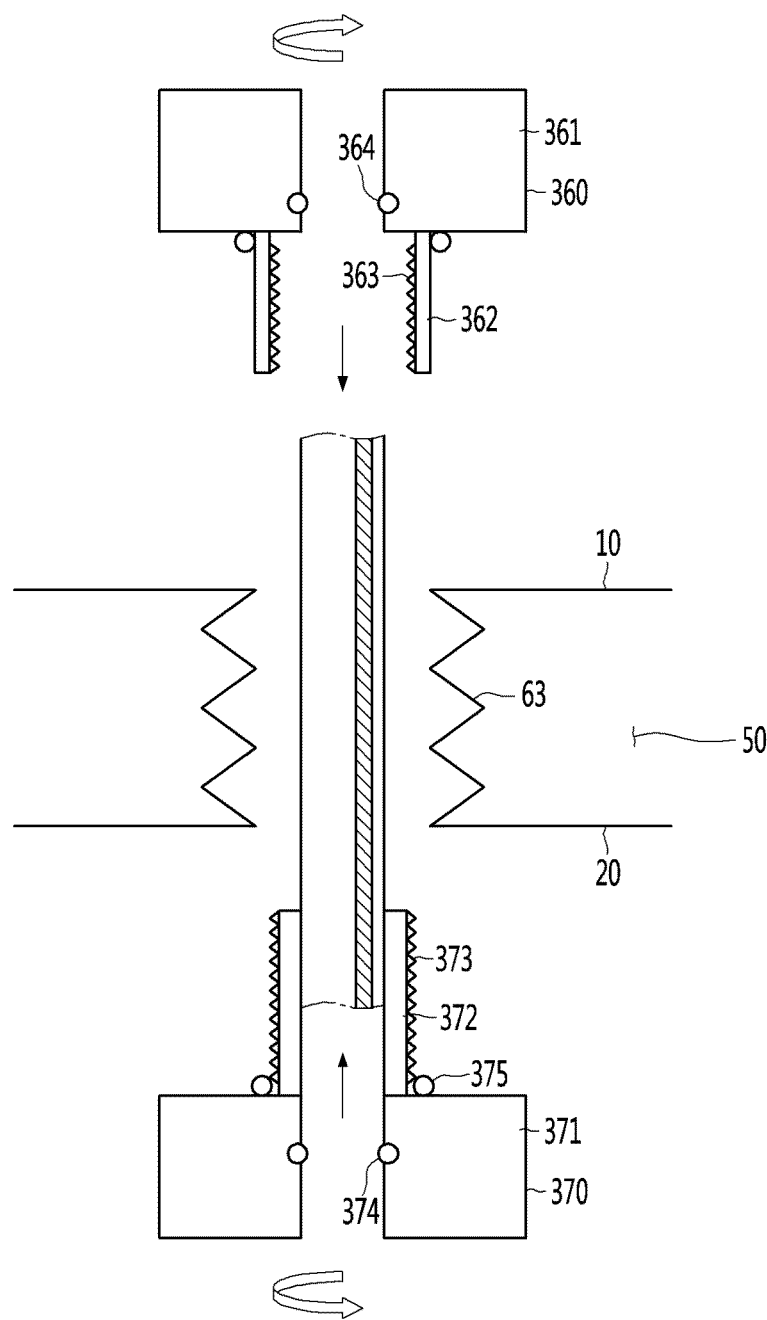

FIGS. 27 and 28 are views of a through sealing part 300 according to another embodiment.

Referring to FIG. 27, this embodiment is different from the embodiment of FIG. 20 in that male and female blocks are engaged with each other, and the sealing member 330 is changed to a sealer such as an O-ring. The description related to FIG. 20 may be applied as it is without any specific explanation.

A first block 360 may be disposed at a side of a first plate member 10, and a second block 370 may be disposed at a side of a second plate member 20. Since the blocks 360 and 370 are similar to each other, one will be described, and the same description will be applied to other blocks as well.

In the first block 360, an outer supporter 361 is caught to be supported on the first plate member 10, and an inner insertion part or pipe 362 is further disposed inside the outer supporter 361 and then inserted into a wrinkled conductive resistance sheet 63. A first coupling part 363 is disposed at at least one point of the inside and outside of the inner insertion part 362.

An outer supporter 371 and the inner insertion part 372 are further disposed on the second block 370. A second coupling part 373 is disposed at at least one point of the inside and outside of the inner insertion part 372.

The outer supporters 361 and 371 are caught on outer surfaces of the plate members 10 and 20 to seal contact surfaces between the blocks 360 and 370 and the plate members 10 and 20, respectively. Outer surface sealers 365 and 375 may be inserted into the contact surfaces of the blocks 360 and 370 and the plate members 10 and 20 to improve reliability of the sealing operation. Inner surface sealers 364 and 374 may be inserted into contact surfaces of inner surfaces of the outer supporters 361 and 371 and an outer surface of the heat exchange pipeline 117 to prevent a fluid from flowing to the inside and outside of the refrigerator. Each of the inner surface sealers 364 and 374 may have a cross-sectional shape similar to a shape of the outer surface of the heat exchange pipeline 117 to completely perform the sealing operation on the contact surfaces. In this case, when the heat exchange pipeline 117 is provided in a single circular shape, the complete sealing operation may be secured by the inner surface sealers 364 and 374.

Each of the sealers 364, 365, 374, 375 may be made of rubber and provided in a manner in which an object made of an elastic material surrounds the outer surface of the block 360 and/or 370.

The coupling parts 363 and 373 may be provided as coupling units, which are disposed on surfaces corresponding to each other. For example, a female screw or thread and a male screw or thread may be provided to be coupled to each other by rotation thereof. The mutual contact surfaces of the sealers 364, 365, 374, and 375 may be sealed to approach each other by the coupling operation of the coupling parts 363 and 373.

The blocks 360 and 370 may be made of a rubber or plastic material and may not interrupt the action of the thermal conductive resistance of the wrinkled conductive resistance sheet 63. A spacing part between the wrinkled conductive resistance sheet 63 and the blocks 369 and 370 may be empty, or the sealing member 330 may be inserted into the spacing part to resist to the thermal conductive transfer and the flow of the fluid.

Referring to FIG. 28, although each of the blocks 360 and 370 is provided as one body, the two members of the blocks 360 and 370 may be integrated with each other in a state of being separated from each other like the embodiment of FIG. 20. After each of the blocks 360 and 370 is provided as one body, the blocks 370 may be coupled to each other in a state of being coupled to the outer surface of the heat exchange pipeline 117 to complete the coupling of the through sealing part 330.

A direction of an arrow indicates a moving direction and a rotation direction of each of the blocks 360 and 370.

FIGS. 29 to 40 are views illustrating various embodiments in which the heat exchange pipeline is installed according to various refrigerators to which the vacuum adiabatic body is applied. For example, the refrigerator, which is illustrated in FIGS. 10, 12, and 14, has a shape in which a single vacuum adiabatic is partitioned into two storage rooms by a partition wall. Here, cold air is supplied to the two storage rooms by a single evaporator. Hereinafter, an embodiment of the heat exchange pipeline according to various refrigerator types is presented. The configuration of the refrigerator which does not specifically describe the configuration of the refrigerator is assumed to be the same as the description already described.

Figure 29:
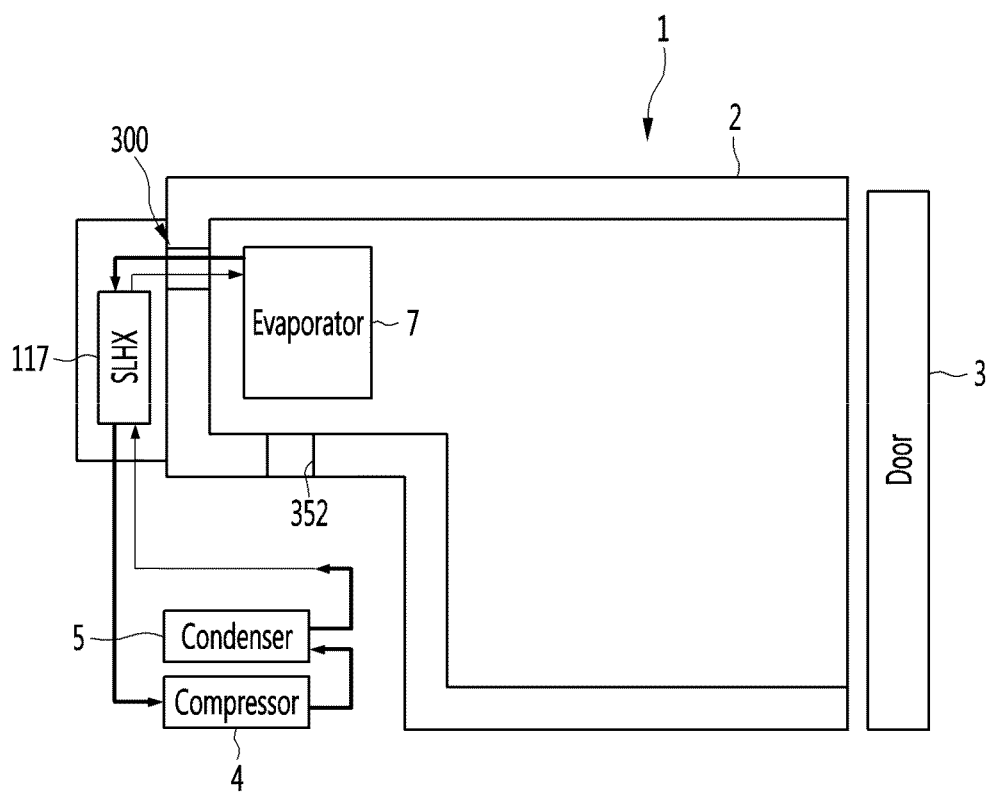
FIGS. 29 to 40 are views illustrating various embodiments in which the heat exchange pipeline is installed according to various refrigerators to which the vacuum adiabatic body is applied.
Figure 30:
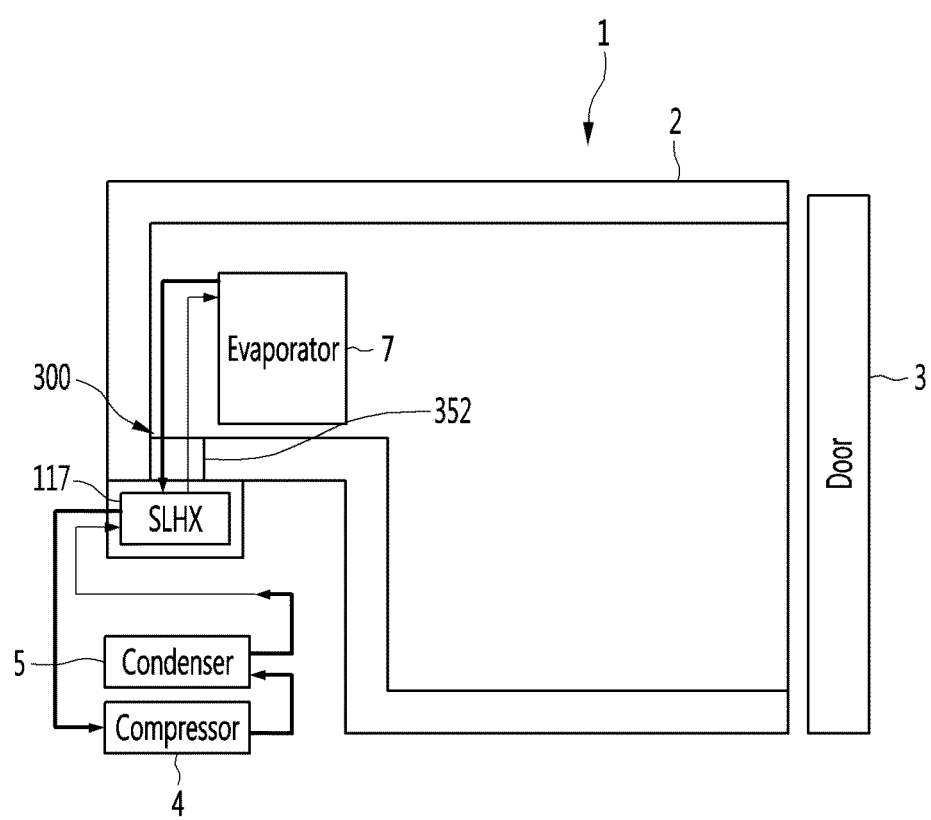

In FIGS. 29 and 30, a single vacuum adiabatic body 2 provides a single storage room for a refrigerator 1, and the cold air is supplied to the single storage room by the single evaporator.

Referring to FIG. 29, the heat exchange pipeline 117 may be disposed outside the second plate member 20. Thus, the heat exchange pipeline 117 may be thermally insulated by the pipeline adiabatic part 301 and/or the pipeline adiabatic case 301.

A through sealing part 300 through which a refrigerant pipeline connecting the heat exchange pipeline 117 to the evaporator 7 may be provided. A defrosting water pipeline 352 to discharge defrosting water generated during an operation of the evaporator 7 may be further provided in the vacuum adiabatic body in addition to the through sealing part 300.

Referring to FIG. 30, the other parts are the same as those in FIG. 29, and the defrosting water pipeline 352 and the through sealing part 300 are shared. Particularly, not only the refrigerant pipeline passes through the single through sealing part 300 but also passes through the defrosting water pipeline 352.

In this embodiment, since the number of openings defined in the vacuum adiabatic body is reduced, the adiabatic loss may be more reduced, and also, the fear of the vacuum breakage may be reduced.

In this embodiment, since the heat exchange pipeline 117 is disposed in the inner space of the machine room 8 (FIGS. 2 and 16), the space utilization may be more improved, the outer appearance of the refrigerator may be more simplified, and the refrigerator 1 may be reduced in volume.

Figure 31:
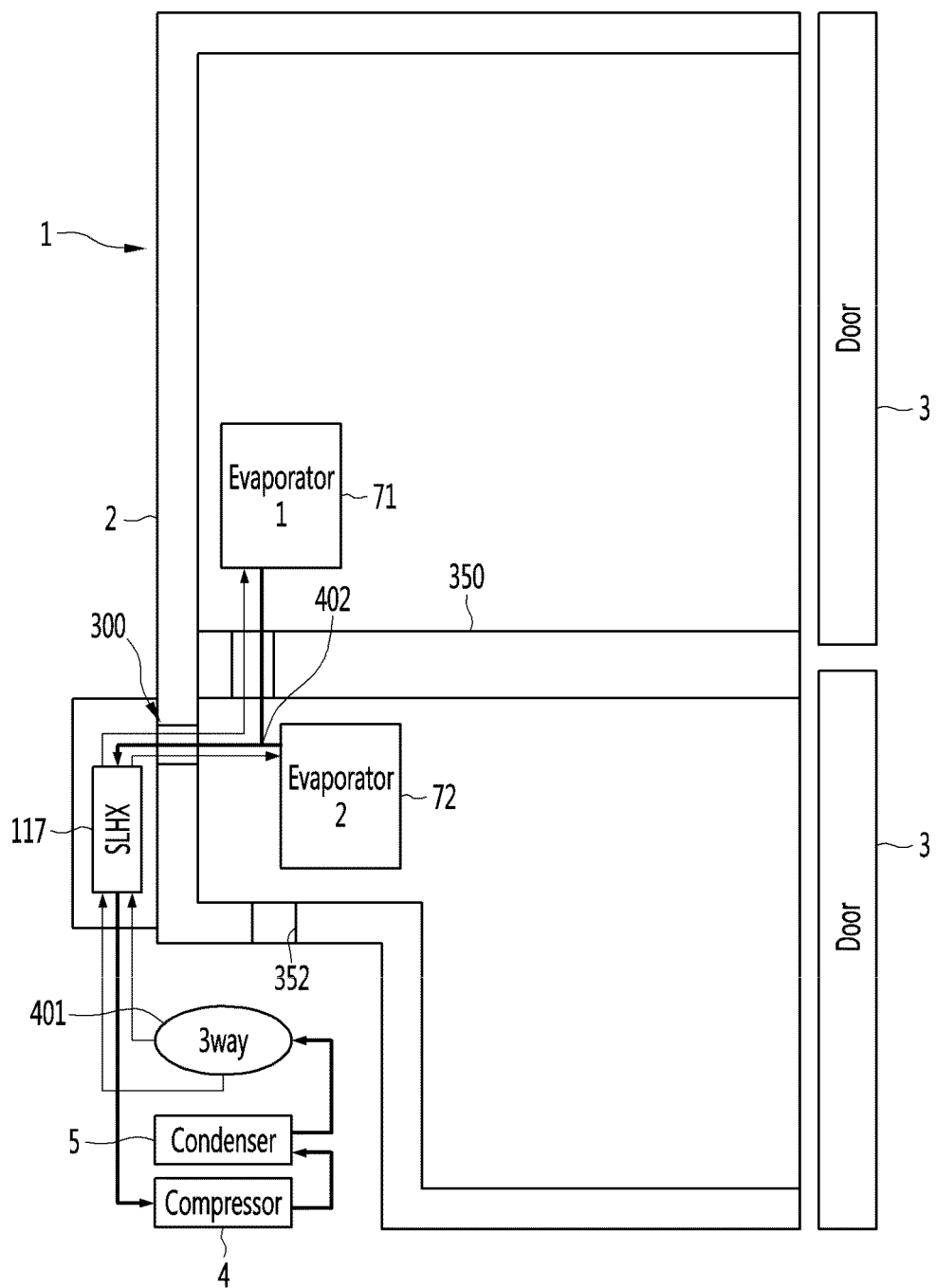
Figure 32:
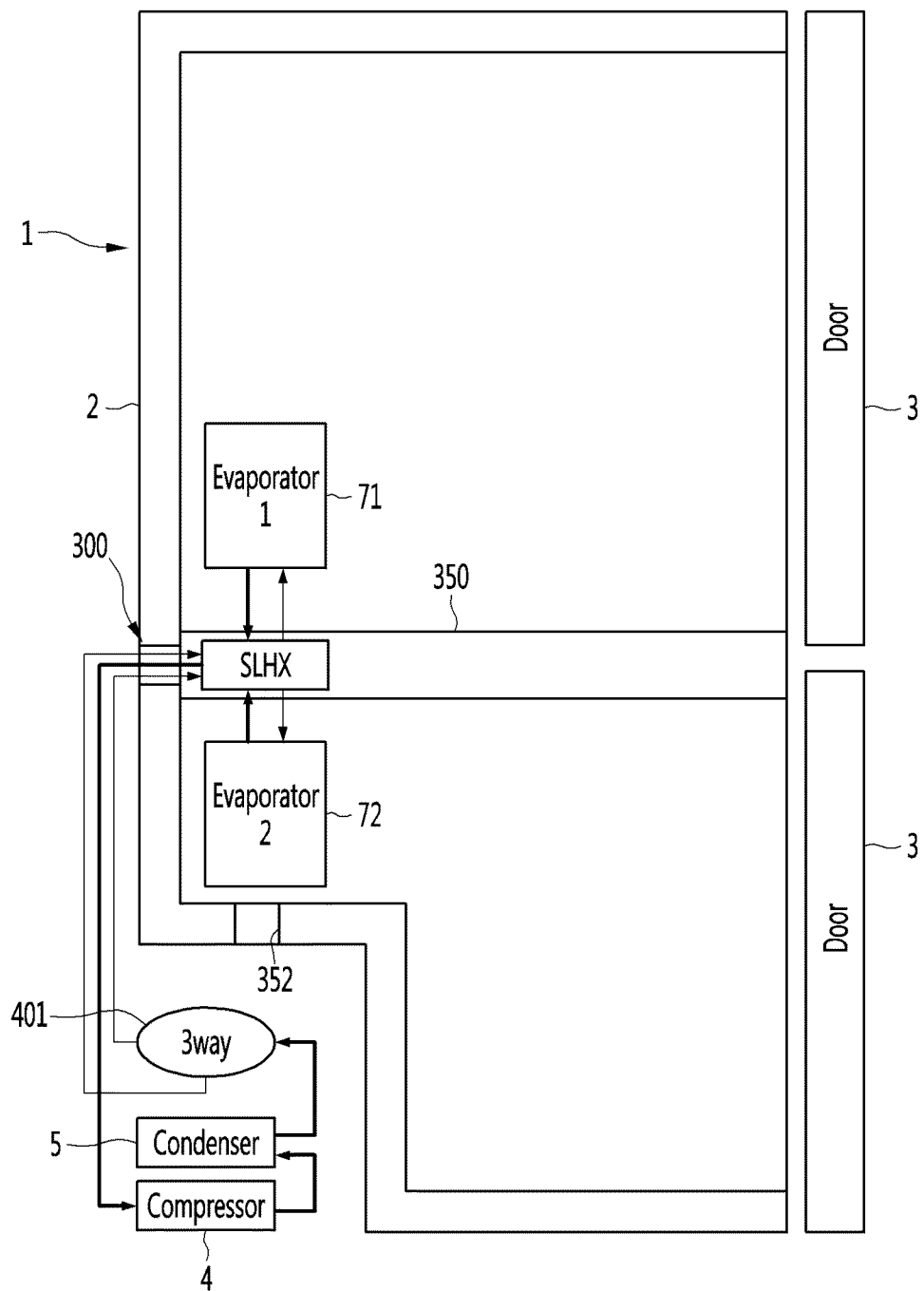
Figure 33:
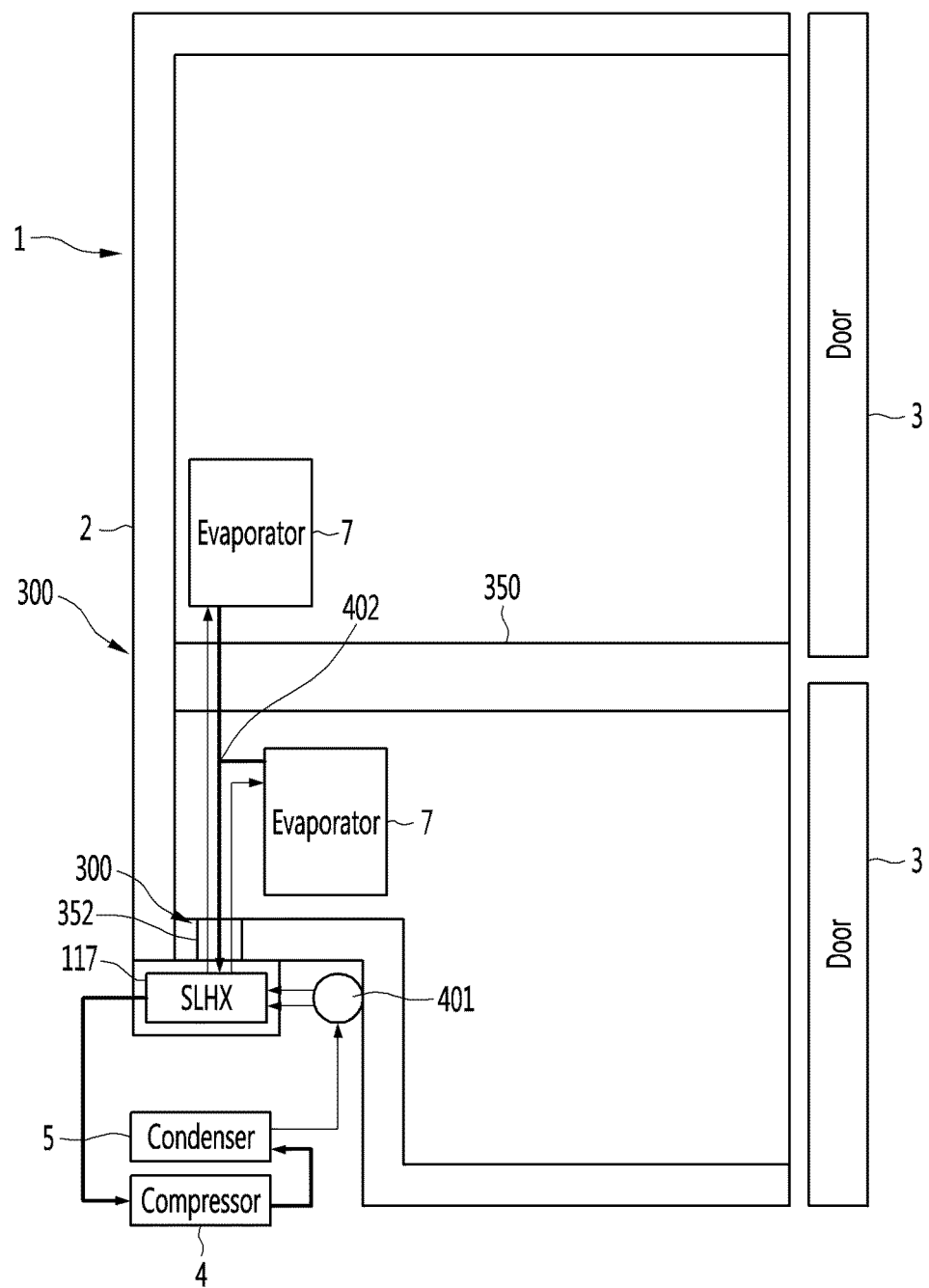

In FIGS. 31 to 33, a refrigerator 1 providing at least two storage rooms in which a single vacuum adiabatic body 2 is partitioned by a partition wall 350 is provided. An evaporator is provided in each of the storage rooms to supply cold air into the at least two storage rooms.

Referring to FIG. 31, the heat exchange pipeline 117 may be disposed outside the second plate member 20. Thus, the heat exchange pipeline 117 may be thermally insulated by the pipeline adiabatic part 301 and/or the pipeline adiabatic case 301.

A through sealing part 300 through which a refrigerant pipeline connecting the heat exchange pipeline 117 to each of the evaporators 71 and 72 may be provided. A defrosting water pipeline 352 for discharging defrosting water generated during an operation of each of the evaporators 71 and 72 may be further provided in the vacuum adiabatic body in addition to the through sealing part 300. The defrosting water pipeline 352 is configured so that defrosting water generated in the evaporators 71 and 72 flows together.

The two evaporators may be provided to adjust an amount of refrigerant introduced into each of the evaporators 71 and 72 according to capacity that is required for each of the evaporators. For this, a refrigerant distribution part 401 may be provided at a rear end of a condenser 5. The refrigerant distributed in the refrigerant distribution part 401 may be heat-exchanged by the heat exchange pipeline 117 and then introduced into each of the evaporators 71 and 72.

The refrigerant evaporated in the evaporators 71 and 72 may be combined in a refrigerant combining part 402 and then perform heat exchange in the heat exchange pipeline 117. The refrigerant combining part 402 may be provided at any point within the refrigerator 1. Since the inlet pipe 172 constituting the refrigerant combining part 402 has a pipeline having a large diameter, it is not preferable that the two outlet pipes 172 pass through the through sealing part 300 because a cross-sectional area of the through sealing part 300 increases. Thus, the refrigerant combining part 402 may be provided inside the vacuum adiabatic body 2, i.e., at any point within the refrigerator.

On the other hand, since the inlet pipe 171 is a capillary, the two pipelines may pass together through the through sealing part 300. Also, since a separate control of the amount of heat exchange is desired for an individual control of the refrigerant 1, the two inlet pipes may individually pass through the through sealing part 300.

In this embodiment, the refrigerator may be preferably applied when the independent control of the storage rooms is required.

Referring to FIG. 32, this embodiment is different from the foregoing embodiments in that the heat exchange pipeline 117 is disposed inside the partition wall 350, like the embodiment of FIG. 12.

According to this embodiment, in addition to the feature of the embodiment of FIG. 31, it is unnecessary to separately provide the pipeline adiabatic part 301 and the pipeline adiabatic case 302 outside the refrigerator 1. Thus, the outer spaces of the refrigerator 1 may be more efficiently utilized. In addition, since the adiabatic constituents of the partition wall 350 are used together with the adiabatic constituents of the heat exchange pipeline 117, the space utilization of the inner space of the refrigerator 1 may be improved.

In this embodiment, the refrigerant combining part 402 (FIG. 31) may be provided inside the partition wall.

Referring to FIG. 33, this embodiment is different from the foregoing embodiments in that the heat exchange pipeline 117 is disposed inside the machine room 8 (FIG. 16), like the embodiment of FIG. 31. In this embodiment, the refrigerant combining part 402 may be provided in a space within the refrigerator 1.

According to this embodiment, in addition to the feature of the embodiment of FIG. 31, the defrosting water pipeline 352 and the through sealing part 300, which are required for driving the evaporators 71 and 72, may be achieved by a single through-structure. That is to say, two inlet pipes 171, outlet pipes 172, and defrosting water pipelines 352 may pass together through the single through sealing part 300 through which the vacuum adiabatic body passes. Thus, according to another embodiment, since the single through-part 300 sufficiently serves as the through-parts, which are disposed to be spaced apart from each other at two positions, the adiabatic loss may be reduced, and the fear of failure due to the vacuum breakage may be reduced.

In this embodiment, since the heat exchange pipeline 117 is installed in the inner space of the machine room 8 (FIG. 16), the machine room 8 may be efficiently utilized, and the refrigerator 1 may not increase in size, thereby more efficiently utilizing a space outside the refrigerator 1. In this embodiment, since the number of openings defined in the vacuum adiabatic body 2 is reduced, the adiabatic loss may be more reduced, and also, the fear of the vacuum breakage or loss may be reduced.

Figure 34:
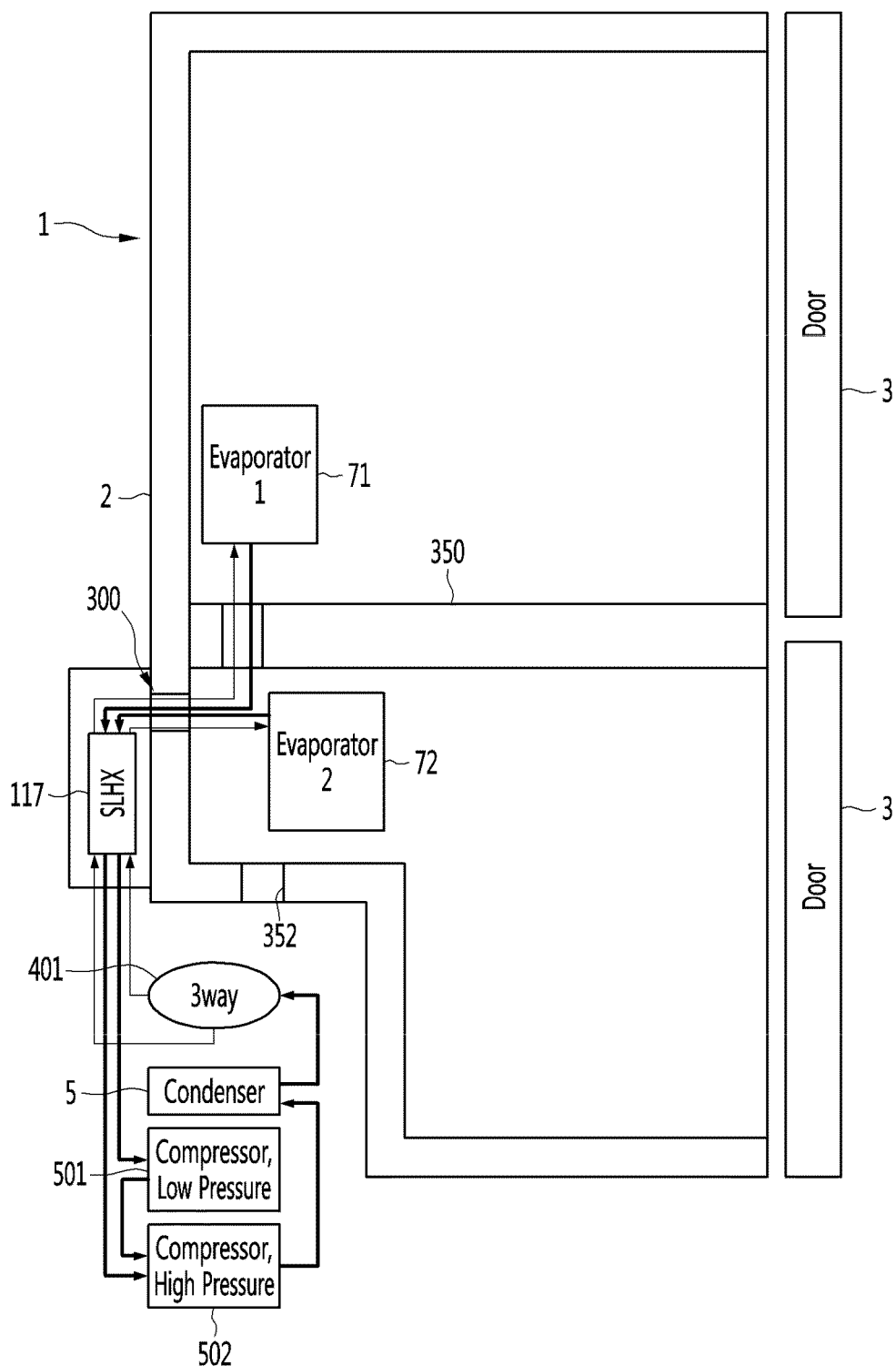
Figure 35:
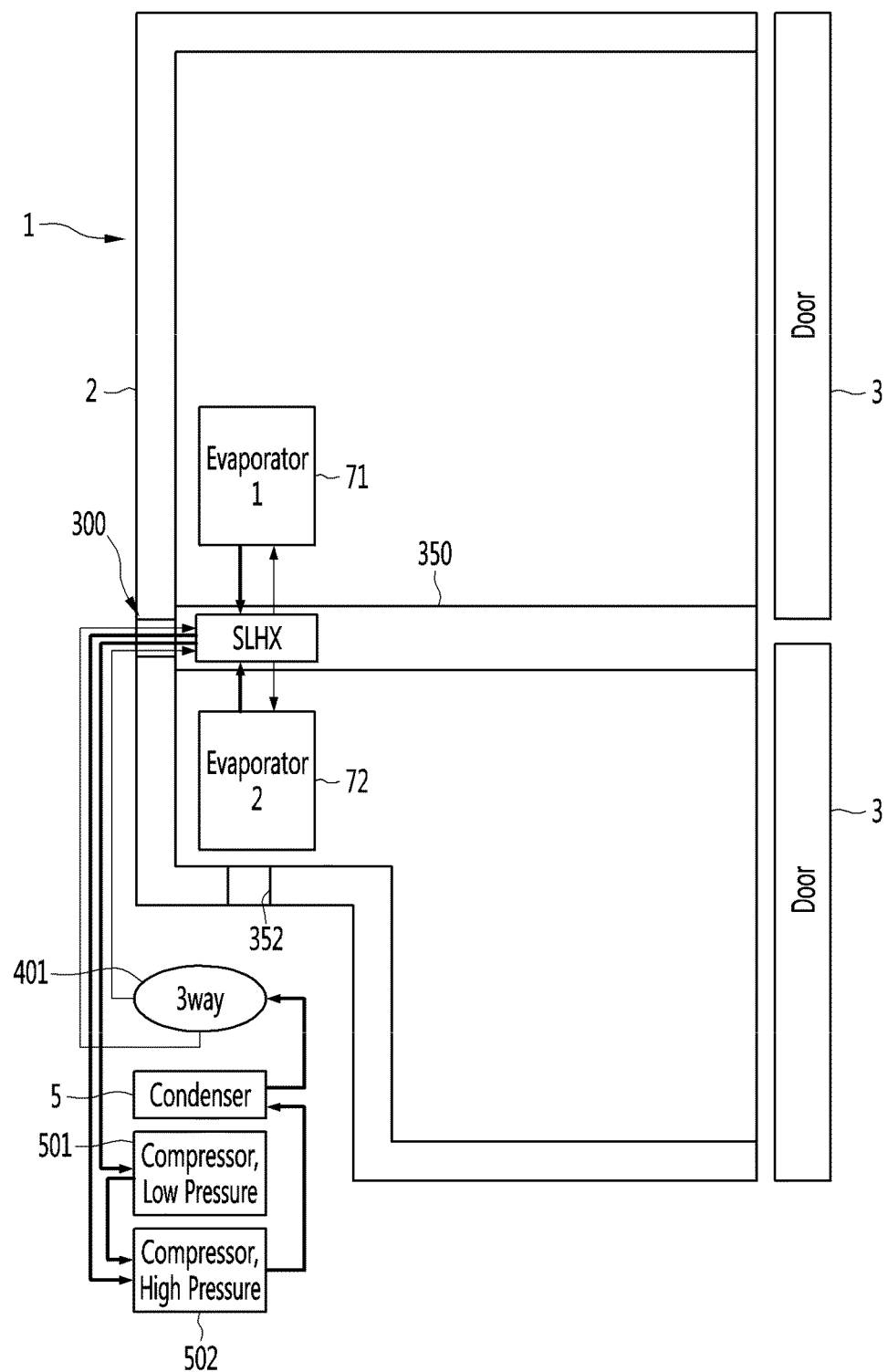
Figure 36:
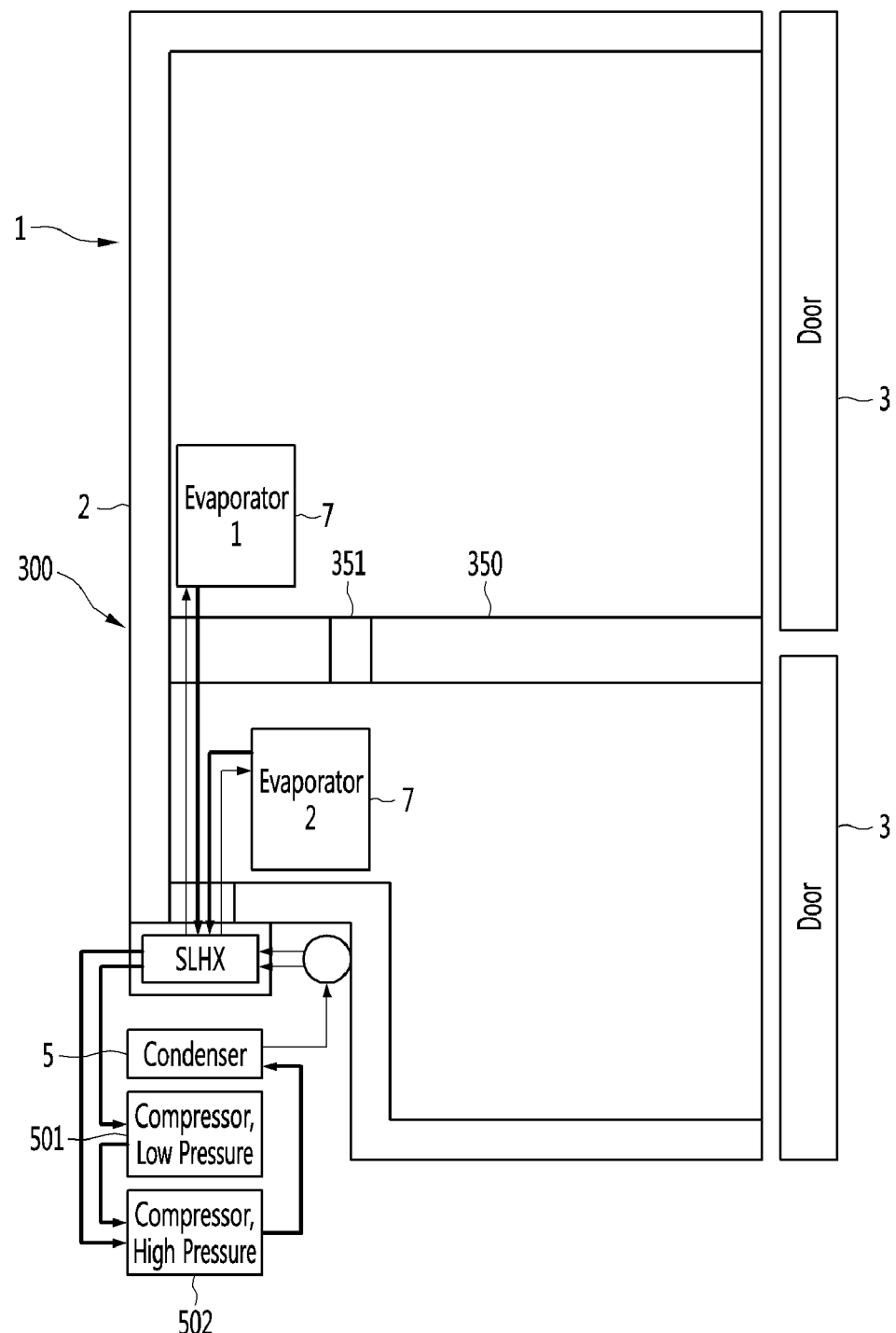

In FIGS. 34 to 36, a refrigerator 1 providing at least two storage rooms in which a single vacuum adiabatic body 2 is partitioned by a partition wall 35 is provided. An evaporator 71, 72 is provided in each of the storage rooms to supply cold air into the at least two storage rooms. Thus, the refrigerator 1 may have a shape similar to that illustrated in FIGS. 31 and 33. However, the refrigerators are different from each other in that two compressors 501 and 502 are provided to enhance compression efficiency and achieve a higher pressure. Since the two compressors 501 and 502 are provided, it is possible to positively cope with the refrigerant of the two evaporators 71 and 72.

An embodiment of FIGS. 34 to 36 is the same as that of FIGS. 31 to 33 except for a configuration related to a compressor, and thus, the relevant description is applied as it is.

Referring to FIG. 34, the refrigerator 1 according to this embodiment may be preferably applied when an independent control of each of storage rooms is required, and a compressor 501 of a low pressure part and a compressor 502 of a high pressure part are provided in series. The two compressors 501 and 502 may reach a higher pressure and supply sufficient cooling power to the two evaporators 71 and 72.

Referring to FIG. 35, the refrigerator according to this embodiment may have improved space utilization. In addition, the compressor 501 of the low pressure part and the compressor 502 of the high pressure part may be provided in series. The two compressors 501 and 502 may reach a higher pressure and supply sufficient cooling power to the two evaporators 71 and 72.

Referring to FIG. 36, in the refrigerator 1 according to this embodiment, since the number of openings defined in the vacuum adiabatic body 2 is reduced, the adiabatic loss may be more reduced, and also, the fear of the vacuum breakage may be reduced. In addition, the compressor 501 of the low pressure part and the compressor 502 of the high pressure part may be provided in series. The two compressors 501 and 502 may reach a higher pressure and supply sufficient cooling power to the two evaporators 71 and 72.

Figure 37:
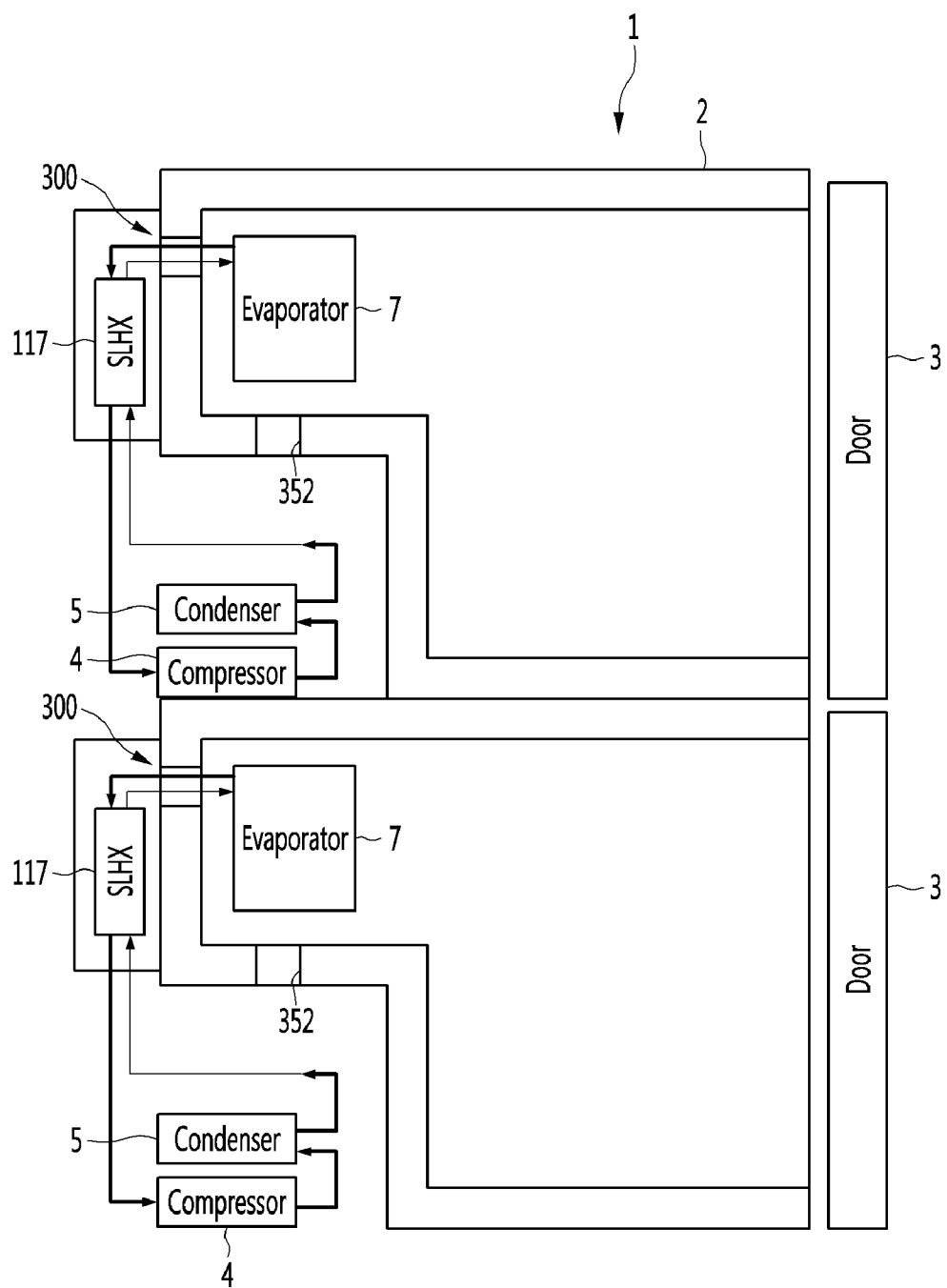
Figure 38:
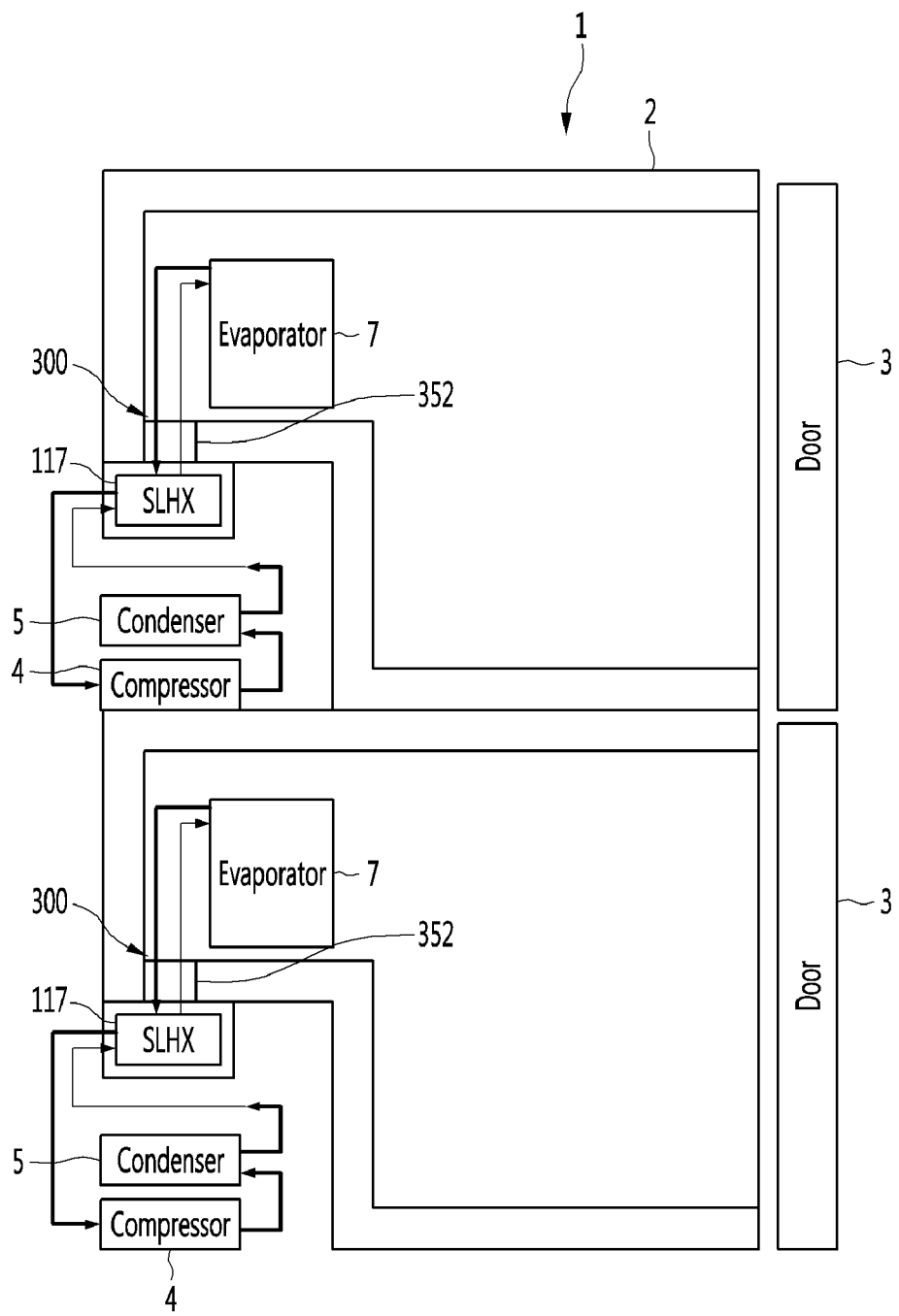

In FIGS. 37 and 38, a refrigerator 1 having a plurality of single storage rooms constituted by a single vacuum adiabatic body 2 is provided. Here, a single evaporator 7 may supply cool air to each of the corresponding single storage room. In this embodiment, each of the storage rooms may operate in a different thermal state so that the refrigerator 1 operates in various configurations. A refrigerator system illustrated in FIGS. 29 and 30 may be applied in a redundant manner, and thus, the same description will be applied to this embodiment as well.

Referring to FIG. 37, the refrigerator illustrated in FIG. 29 may be viewed as a structure in which the storage rooms of the refrigerator 1 are stacked on both the upper and lower sides. Each of the storage rooms of the refrigerator 1 is provided in different temperature states so as to be adapted for the needs of the consumer.

Referring to FIG. 38, the refrigerator illustrated in FIG. 30 may be viewed as a structure in which the storage rooms of the refrigerator 1 are stacked on both the upper and lower sides. Each of the storage rooms of the refrigerator 1 may be also provided in different temperature states so as to be actively adapted for the needs of the consumer.

The storage rooms of FIGS. 37 and 38 may be used in combination with each other. For example, in one of the refrigerators 1 (FIG. 38), the heat exchange pipeline 117 is located in the machine room 8. In the other refrigerator 1 (FIG. 37), the heat exchange pipeline 117 may be placed on the outer rear surface of the vacuum adiabatic body 117.

Figure 39:
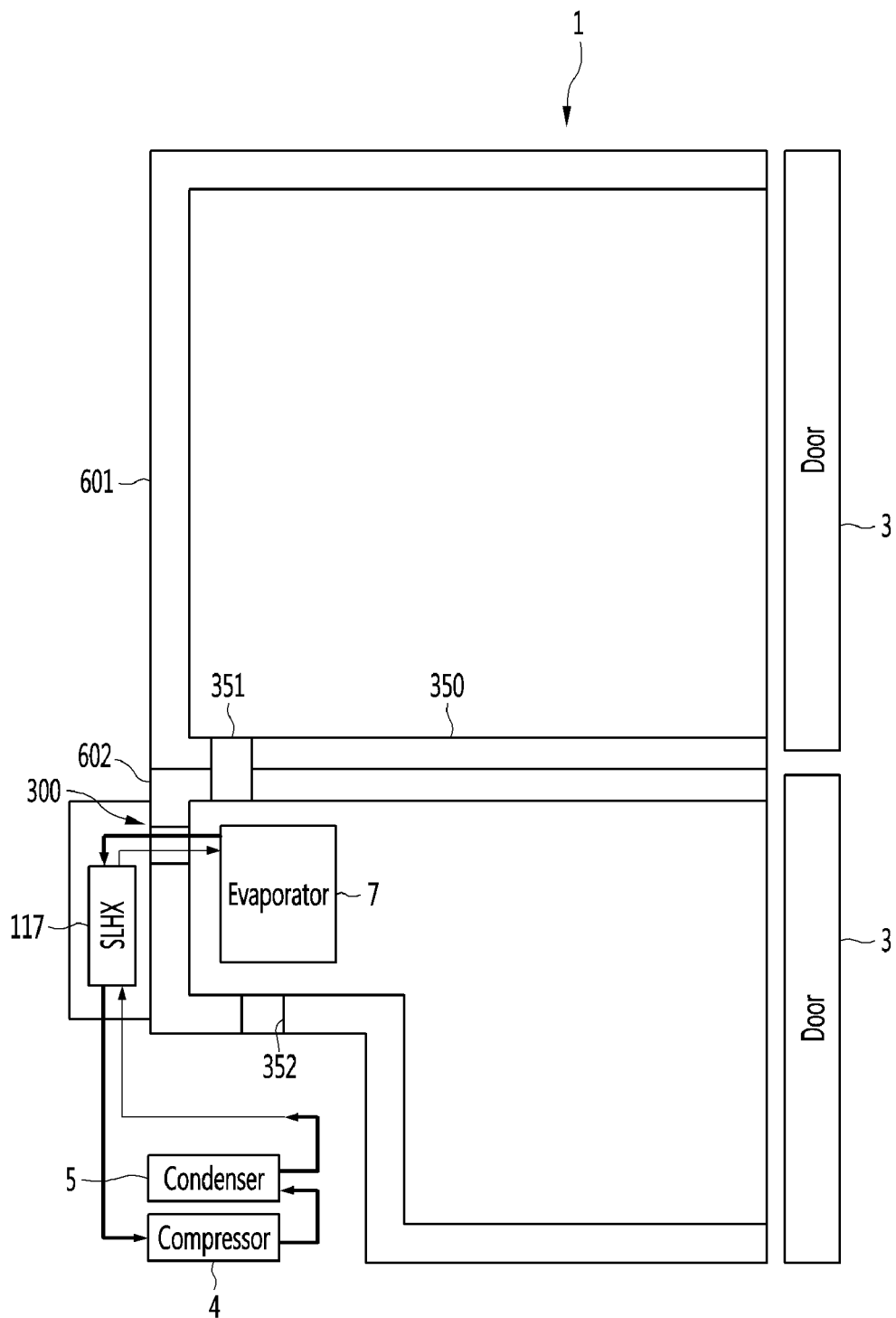

In FIG. 39, the refrigerator 1 includes at least two vacuum adiabatic bodies. Each of the at least two vacuum adiabatic bodies or main bodies 601 and 602 provides a storage room. Thus, the refrigerator 1 may include at least two storage rooms. Particularly, this embodiment is different from the foregoing embodiment in that cold air is supplied to all of the at least two storage rooms by a single evaporator 7.

Referring to FIG. 39, a first main body 601 and a second main body 602, which are provided as the vacuum adiabatic bodies, are provided. Each of the main bodies 601 and 620 may be selectively opened and closed by doors 3, respectively.

The necessary constituents for the refrigeration system such as the compressor 4, the condenser 5, the evaporator 7, the heat exchange pipeline 117, and the defrosting water pipeline 352 are provided around the second body 602. The heat exchange pipeline 117 may be withdrawn to the outside by passing through the vacuum adiabatic body 601 and/or 602 through the through sealing part 300. The cold air may be directly supplied from the evaporator 7 to the inside of the second main body 602 the refrigerator.

The first main body 601 and the second main body 602 may communicate with each other by a cold air passage 351. The cold air passage 351 may be provided as two passages for supplying and collecting the cold air to sufficiently supply the cold air. The cold air passage 351 may be provided as a passage that passes through each of the main bodies 601 and 602 and connect the main bodies 601 and 602 to each other.

According to this embodiment, the refrigeration system in which the single heat exchange pipeline 117 is provided may provide cold air to the two vacuum adiabatic bodies 601 and 602. Each of the vacuum adiabatic bodies 601 and 602 provides a storage room, and each of the storage rooms may operate without any temperature interference therebetween.

Figure 40:
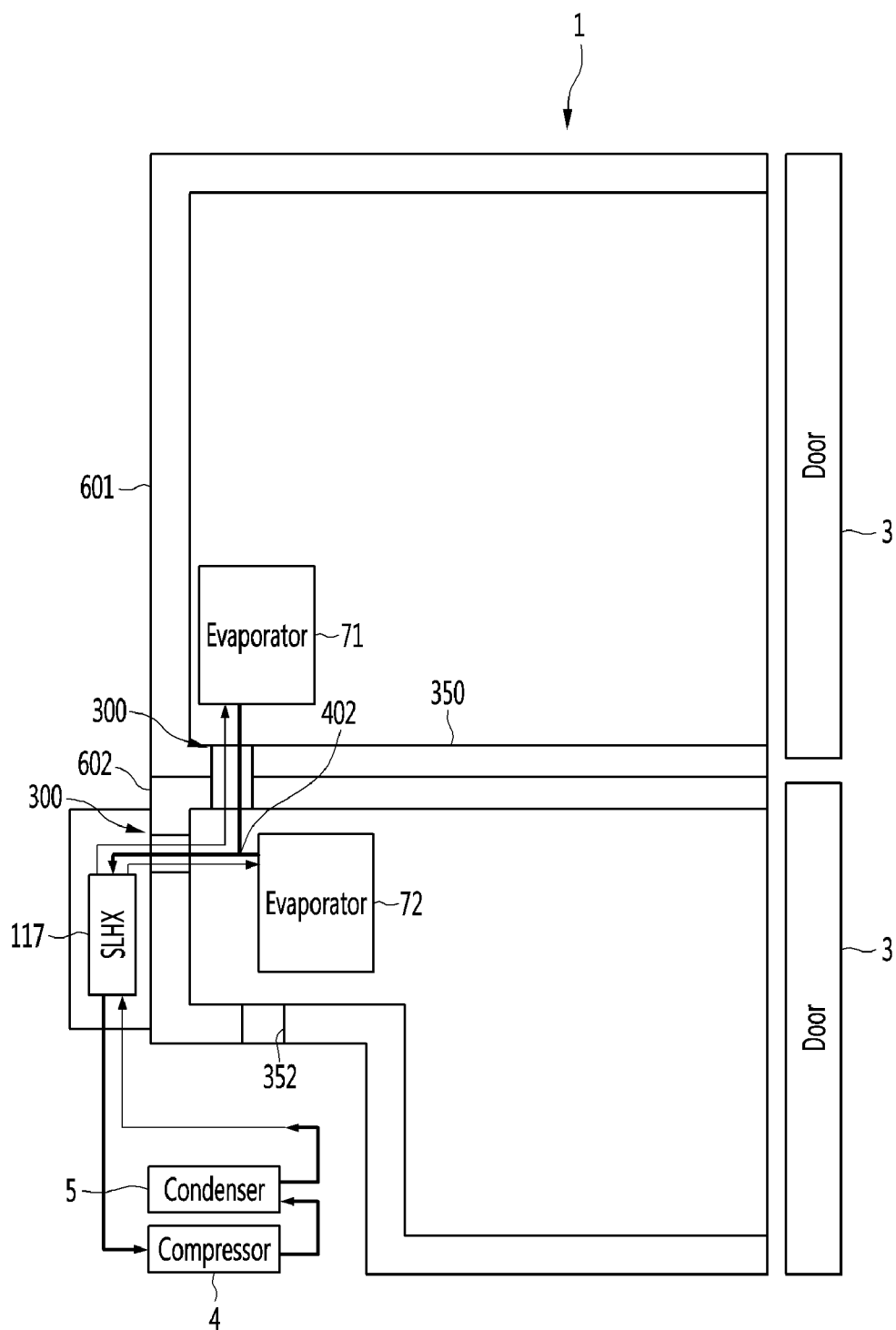

In the embodiment of FIG. 40, the refrigerator includes at least two vacuum adiabatic bodies 601 and 602. Each of the at least two vacuum adiabatic bodies 601 and 602 provides a storage room. Thus, the refrigerator 1 may include at least two storage rooms. Particularly, this embodiment is different from the foregoing embodiment in that cold air provided in one refrigeration system is supplied to each of the at least two storage rooms by the evaporators 71 and 72. This embodiment is different from the embodiment of FIG. 39 in that an evaporator 71 and 72 is provided in each of storage rooms, and others are the same. Thus, the description of FIG. 39 will be applied as it is without any specific explanation.

Referring to FIG. 40, to supply the refrigerant to the two evaporators 71 and 72, a refrigerant distribution part 401 and a refrigerant combining part 402 are provided. An evaporator 71, 72 is provided inside each of the main bodies 601 and 602 to supply cool air to the corresponding storage room.

A through sealing part 300 may be provided at fixed facing positions of the first main body 601 and the second main body 602 so that the inlet pipe and the outlet pipe connected to the first evaporator 71 pass through the first main body 601 and the second main body 602.

According to this embodiment, the refrigeration system in which the single heat exchange pipeline 117 is provided may provide cold air to the two vacuum adiabatic bodies 601 and 602. Since each of the vacuum adiabatic bodies 601 and 602 not only provides the storage room, but also the evaporator 72, 72 is provided in each of the storage rooms, an influence of the interference of each storage chamber may be removed, and the storage rooms may be completely independently used.

According to the embodiments, when the vacuum adiabatic body is used, since the essentially used heat exchange pipeline is disposed in the outer space, which is not related to the vacuum, the interference between the vacuum space part and the heat exchange pipeline may be removed to expect the further effect on the actual commercialization.

In more detail, there are the effects of reducing the heat loss due to the reduction of the number of through-parts, improving the convenience of the work, and reducing the fear of the vacuum breakage.

Embodiments provide a vacuum adiabatic body in which difficulty in work is solved at a portion at which a heat exchange pipeline passes through a vacuum space part, and the number of penetrated portions is reduced.

Embodiments also provide a vacuum adiabatic body in which a gas generated from a welding part of two pipelines constituting the heat exchange pipeline does not have an influence on an inner space of a vacuum space part.

Embodiments also provide a vacuum adiabatic body in which a pressure loss of a refrigerant due to sharp bending of a heat exchange pipeline is reduced.

Embodiments also provide a vacuum adiabatic body in which leakage and difficulty of work, which occur due to heterogeneous welding between a heat exchange pipeline and a vacuum space part, are solved.

Embodiments also provide a vacuum adiabatic body in which a heat exchange pipeline is easily installed, and vacuum breakage within the vacuum adiabatic body is prevented at first.

In one embodiment, a vacuum adiabatic body includes: a heat exchange pipeline disposed in at least one of a first space and a second space; a through-part which is provided in at least one of a first plate member and a second plate member and through which a refrigerant pipe constituting the heat exchange pipeline passes; and a fourth space configured to define a space in which at least a portion of the heat exchange pipeline is disposed and filled with an adiabatic material, wherein the fourth space has a volume less than that of a third space, and a heat exchange area on which an inlet pipe and an outlet pipe are heat-exchanged with each other in the fourth space is greater than that in the third space.

The heat exchange pipeline may be advantageous in that it is not inconvenient to perform works such as being buried in advance and welded inside the vacuum space part and is also convenient for repairing. Since the heat exchange is not exposed to the vacuum space part, the vacuum space part may not be adversely affected.

In another embodiment, the vacuum adiabatic body includes: a heat exchange pipeline including at least two pipelines which pass through a first plate member and a second plate member to allow a refrigerant to move between a first space and a second space; and a through sealing part which allows the heat exchange pipeline to pass through a first point of the first plate member and a second point of the second plate member, which is adjacent to the first point, without contacting a third space. Thus, there is no bad influence on an adiabatic loss.

The heat exchange pipeline may be gathered into at least one point of the first space or the second space which is adjacent to the through sealing part so that the at least two pipelines are heat-exchanged with each other. Thus, the heat exchange pipeline may lead to a sufficient heat exchange effect in a separate space.

According to the through sealing part, an action of the heat exchange pipeline on the vacuum space part may be prevented.

A heat resistance unit that resists heat transfer between the plate members may include a conductive resistance sheet that resists conduction of heat transferred along a wall of the vacuum space part and may further include a side frame coupled to the conductive resistance sheet.

Also, the heat resistance unit may include at least one radiation resistance sheet that is provided in a plate shape within the vacuum space part or may include a porous material that resists radiation heat transfer between the second plate member and the first plate member within the vacuum space part.

According to the embodiment, the number of through-parts or gaps through which the heat exchange pipeline passes through the vacuum space part may be reduced to one, and the through-part may be sealed by the separate conductive resistance sheet. Thus, the heat loss may be reduced, and also, the fear of vacuum breakage of the vacuum space part may be also reduced.

According to the embodiment, since the heat exchange pipeline is not exposed to the vacuum space part, the increase of the gas within the vacuum space part due to the heat exchange pipeline may be prevented to improve the lifespan of the product.

According to the embodiment, since there is no need to unreasonably bend the heat exchange pipeline in the vacuum space part, the pressure loss of the refrigerant due to the unexpected deformation of the refrigerant pipeline may be reduced.

According to the embodiment, the installation work of the heat exchange pipeline may be easy, the reliability of the sealing maintenance of the vacuum space part may be improved.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A vacuum adiabatic body comprising:
a first plate;
a second plate;
a vacuum space provided between the first plate and the second plate;
an opening provided in at least one of the first plate or the second plate;
a sealer provided at the opening;
a pipeline passing through the sealer; and
at least one block configured to support the pipeline and to shield the opening, the at least one block including a portion inserted into the opening,
wherein the sealer is disposed between the portion of the at least one block and an inner surface of the opening.

2. The vacuum adiabatic body according to claim 1, wherein the at least one block comprises a first block supported by the first plate and a second block supported by the second plate.

3. The vacuum adiabatic body according to claim 1, wherein the at least one block comprises a first block provided at the first plate and a second block provided at the second plate, and
wherein the portion of the at least one block includes a first portion provided in first block and a second portion provided in the second block.

4. The vacuum adiabatic body according to claim 1, wherein the at least one block comprises a first block to surround a first portion of the pipeline and a second block to surround a second portion of the pipeline, and
wherein the first block is spaced apart from the second block.

5. The vacuum adiabatic body according to claim 1, wherein the at least one block comprises a first block and a second block that are coupled to each other, and
wherein the first block is provided at the first plate and the second block is provided at the second plate.

6. The vacuum adiabatic body according to claim 5, wherein the at least one block includes a first block and a second block, and the sealer is provided between the first and second blocks and surrounds the pipeline.

7. The vacuum adiabatic body according to claim 1, further comprising a conductive resistance sheet configured to reduce heat conduction between the first and second plate, the conductive resistance sheet being connected to the first plate,
wherein the conductive resistance sheet defines the inner surface of the opening.

8. The vacuum adiabatic body according to claim 1, wherein the sealer is filled in the conductive resistance sheet and is configured to surround the pipeline.

9. The vacuum adiabatic body according to claim 1, wherein at least one block comprises a supporter supported by the first plate or the second plate and the portion inserted into the opening and to contact the sealer.

10. The vacuum adiabatic body according to claim 1, further comprising an adiabatic material provided to shield the at least one block and in which the pipeline passes.

11. A vacuum adiabatic body comprising:
a first plate;
a second plate;
a vacuum space provided between the first plate and the second plate;
an opening provided in at least one of the first plate or the second plate;
a sealer provided at the opening;
a pipeline passing through the sealer; and
at least one block configured to support the pipeline and to shield the opening,
wherein at least one block comprises:
a first block supported by the first plate and including a first insertion part having a first coupling part; and
a second block supported by the second plate and including a second insertion part having a second coupling part that is screw-coupled to the first coupling part.

12. A vacuum adiabatic body comprising:
a first plate;
a second plate;
a vacuum space provided between the first plate and the second plate;
a conductive resistance sheet configured to reduce heat conduction between the first and second plate, the conductive resistance sheet being connected to the first plate;
an opening provided in at least one of the first plate or the second plate;
a sealer provided at the opening;
a pipeline passing through the sealer; and
at least one block configured to support the pipeline and to shield the opening.

13. A vacuum adiabatic body comprising:
a first plate;
a second plate;

a vacuum space provided between the first plate and the second plate;

an opening provided in at least one of the first plate or the second plate;

a sealer provided at the opening;

a pipeline passing through the sealer; and at least one block configured to support the pipeline and to shield the opening, wherein at least one block comprises:
- a first block including a first supporter supported by the first plate and a first insertion part having a first coupling part; and
- a second block including a second supporter supported by the second plate and a second insertion part having a second coupling part that is coupled to the first coupling part;

wherein the sealer comprises at least one of:
- a first sealer provided at an interface of the first supporter and the first plate, or
- a second sealer provided at an interface of the first supporter and the pipeline.

* * * * *